(12) United States Patent
Peitzke et al.

(10) Patent No.: US 8,674,541 B2
(45) Date of Patent: Mar. 18, 2014

(54) RAIL BASED POTENTIAL ENERGY STORAGE FOR UTILITY GRID ANCILLARY SERVICES

(75) Inventors: William R. Peitzke, Montecito, CA (US); Matthew B. Brown, San Diego, CA (US)

(73) Assignee: Advanced Rail Energy Storage, LLC, Seattle, WA (US)

( * ) Notice: Subject to any disclaimer, the term of this patent is extended or adjusted under 35 U.S.C. 154(b) by 0 days.

(21) Appl. No.: 13/571,231

(22) Filed: Aug. 9, 2012

(65) Prior Publication Data

US 2013/0043721 A1    Feb. 21, 2013

Related U.S. Application Data

(60) Provisional application No. 61/524,237, filed on Aug. 16, 2011.

(51) Int. Cl.
*B60L 1/00* (2006.01)
*B60L 3/00* (2006.01)
*H02G 3/00* (2006.01)

(52) U.S. Cl.
USPC ........................................... 307/9.1

(58) Field of Classification Search
USPC ............. 307/9.1, 82, 84, 86; 105/35; 700/295
See application file for complete search history.

(56) References Cited

U.S. PATENT DOCUMENTS

2010/0084916 A1* 4/2010 Kumar et al. .................. 307/9.1

* cited by examiner

*Primary Examiner* — Carlos Amaya
(74) *Attorney, Agent, or Firm* — Felix L. Fischer

(57) ABSTRACT

A utility grid ancillary services system employs an inclined track with a utility grid connection system associated with the track. Shuttle units ride on the inclined track and have a motor/generator and an onboard electrical system for control. The motor/generator is connected to draw power from or provide power to the utility grid connection system. A controller in communication with an electric utility controls the onboard electrical system. Software modules in the controller increase uphill force responsive to a regulation down command from the utility thereby absorbing additional power from the utility grid or decreasing the amount of power provided to the grid. The software modules decrease force in an uphill direction responsive to a regulation up command from the utility thereby generating additional power to supply the utility grid or decreasing the amount of power absorbed from the grid.

23 Claims, 21 Drawing Sheets

US 8,674,541 B2

RAIL BASED POTENTIAL ENERGY STORAGE FOR UTILITY GRID ANCILLARY SERVICES

REFERENCES TO RELATED APPLICATIONS

This application claims priority of U.S. provisional application Ser. No. 61/524,237 filed on Aug. 16, 2011 having the same title as the present application, the disclosure of which is incorporated herein by reference. This application is copending with application Ser. No. 12/852,504 filed on Aug. 8, 2010 entitled UTILITY SCALE ELECTRIC ENERGY STORAGE SYSTEM, having a common assignee with the present application, and application Ser. No. 13/449,178 filed on Apr. 17, 2012 entitled COMBINED SYNCHRONOUS AND ASYNCHRONOUS POWER SUPPLY FOR ELECTRICALLY POWERED SHUTTLE TRAINS having a common assignee with the present application, the disclosures of which are both incorporated herein by reference.

BACKGROUND OF THE INVENTION

1. Field

The embodiments disclosed herein are in the technical field of utility grid power regulation. More particularly, the present invention is a potential energy storage ancillary services system for connection to the utility grid and employing electrically powered heavy mass shuttle units on a track system to absorb and provide electrical power from and to the grid.

2. Related Art

The electric power grid is increasingly complex and the matching of power generation supply with power usage is a critical element in maintaining stability in operation. This issue is becoming more complicated with the addition of alternative energy generation sources such as wind power and solar power, which have inherent issues with consistency of power production. As such, transmission system operators and utilities require an increasing amount of ancillary services in order to maintain control and reliability of the electric grid. Based on usage demands, system loading, generation resources, and maintenance requirements, ancillary services provide a means for balancing generation with load as close to instantaneously as possible while also providing a continuous source of reserve power. Ancillary services are comprised primarily of the following components. Regulation is provided by power sources online, on automatic generation control, that can respond rapidly to system operator requests for trimming the minute-to-minute fluctuations in system load (as may be reflected by changes in the grid frequency), by providing either regulation-up (adding power to the grid) or regulation-down (withdrawing power from the grid); Spinning Reserves,—are power sources which are synchronized to the grid and may be brought up to full output within 10 minutes; Supplemental Reserves—offline reserves which may be brought to full capacity online within 10 minutes; Replacement Reserves—offline resources which may restore Spinning and Supplemental Reserves to their pre-contingency status; Black Start—reserve power capacity to re-energize a failed transmission system and VAR Support—the injection or absorption of reactive power (VAR) to maintain grid voltage by synchronizing current to frequency.

In order to provide these ancillary services it is necessary to have a power capacity and an energy reserve. As such, energy storage technologies are ideal suppliers of ancillary services; they have the capacity to respond faster to changing loads than generators and are capable of providing the required functions without the production of fossil fuel emissions.

Ancillary services from energy storage may be provided by battery technologies, capacitors, kinetic energy storage systems such as flywheels or potential energy storage systems such as pumped hydro; however, each technology has disadvantages in its ability to perform the required functions. Battery technologies have a limited cycle life, which is related to the depth of discharge per cycle. This necessitates battery replacement after a limited operating life, which greatly impacts the cost effectiveness of batteries deployed in high cycle ancillary services operations such as Regulation. Conversely, lower cycle rate ancillary services such as Spinning and Supplemental reserves have a greater depth of discharge which also reduces battery life, in all, making batteries an expensive option for ancillary services. Capacitors have very fast response times and potentially high power levels but very limited amounts of energy storage per unit of power; the same holds true for flywheels in which delivery at rated power is typically measured in minutes. By far the most common form of energy storage is pumped hydro. Pumped hydro is a form of potential energy storage in which electricity from the grid is used to pump water from a lower elevation reservoir to a higher elevation; the stored water may then be released through turbines to convert the stored energy into electricity upon demand. The round-trip storage cycle efficiency tosses of such systems are typically in the range of 25% and the difficulties in permitting, constructing and operating makes pumped hydro difficult to implement. It can take more than a decade to construct such a system. Unlike batteries, capacitors and flywheels a pumped hydro system is unlikely to be deployed for frequency regulation unless it is already in operation due to the limited output efficiency range of reversible turbines and their stow response times from shutdown to their peak efficiency flow rates. As such pumped hydro is generally only deployed for Regulation while actively charging or discharging and its economic efficiency as a provider of regulation service is limited by its overall system efficiency and the regional potential for time of use electricity price arbitrage.

An alternative form of potential energy storage technology may be achieved by constructing an electrified steel railway network which employs traction drive shuttle-trains with regenerative braking capability, operating on a closed low-friction automated steel rail network, to transport heavy masses between two storage yards at different elevations, converting electricity into potential energy and back into electric power as needed. In such a system when excess energy is available on the grid, the masses are transported uphill from a tower storage yard, drawing electricity from the grid to power the motors of shuttle-trains as they move the masses against the force of gravity to an upper storage yard; when the grid requires energy to meet periods of high demand, the process may be reversed, the shuttle-trains return the masses to the lower storage yard with their generators converting the potential energy of the masses back into electricity in a highly efficient process.

Therefore it is desirable to provide a fast responding, minimally polluting and cost effective ancillary services system for regulation up, regulation down, spinning, supplemental and replacement reserves, black start, and VAR support which may provide these services without a requirement to be actively providing bulk energy storage or supply at the time the ancillary service request is received.

SUMMARY OF THE INVENTION

Embodiments disclosed herein provide a utility grid ancillary services system employing an inclined track with a utility grid connection system associated with the track. At least one shuttle unit rides on the inclined track and has at least one motor/generator and an electrical system controlling the one motor/generator. The motor/generator is connected to draw power from or provide power to the utility grid connection system. A controller in communication with an electric utility has a processor with software instructions contained in a memory for control of the electrical system. The controller responsive to software instructions increases force generated by the motor/generator in an uphill direction to change the speed of said shuttle unit on the inclined track responsive to a regulation down command from the utility thereby absorbing additional power from the utility grid or decreasing the amount of power provided to the grid. The controller responsive to the software instructions decrease force generated by the motor/generator in an uphill direction to change the speed of said shuttle unit on the inclined track responsive to a regulation up command from the utility thereby generating additional power to supply the utility grid or decreasing the amount of power absorbed from the grid.

DETAILED DESCRIPTION OF THE INVENTION

A rail based potential energy storage system as described above is capable of providing ancillary services in an efficient manner. However were such a system to be deployed to function primarily as a provider of ancillary services (rather than be employed for bulk energy storage) there are significant differences in the structural elements and control methods, which the embodiments disclosed herein provide. These embodiments provide the structure for a rail based Fast Response Potential Energy Storage System for providing ancillary services on an electric grid with superior efficiency and response rates to pumped hydro, lower life-cycle costs than batteries and superior energy to power ratios than kinetic energy systems and capacitors.

Figure 1:
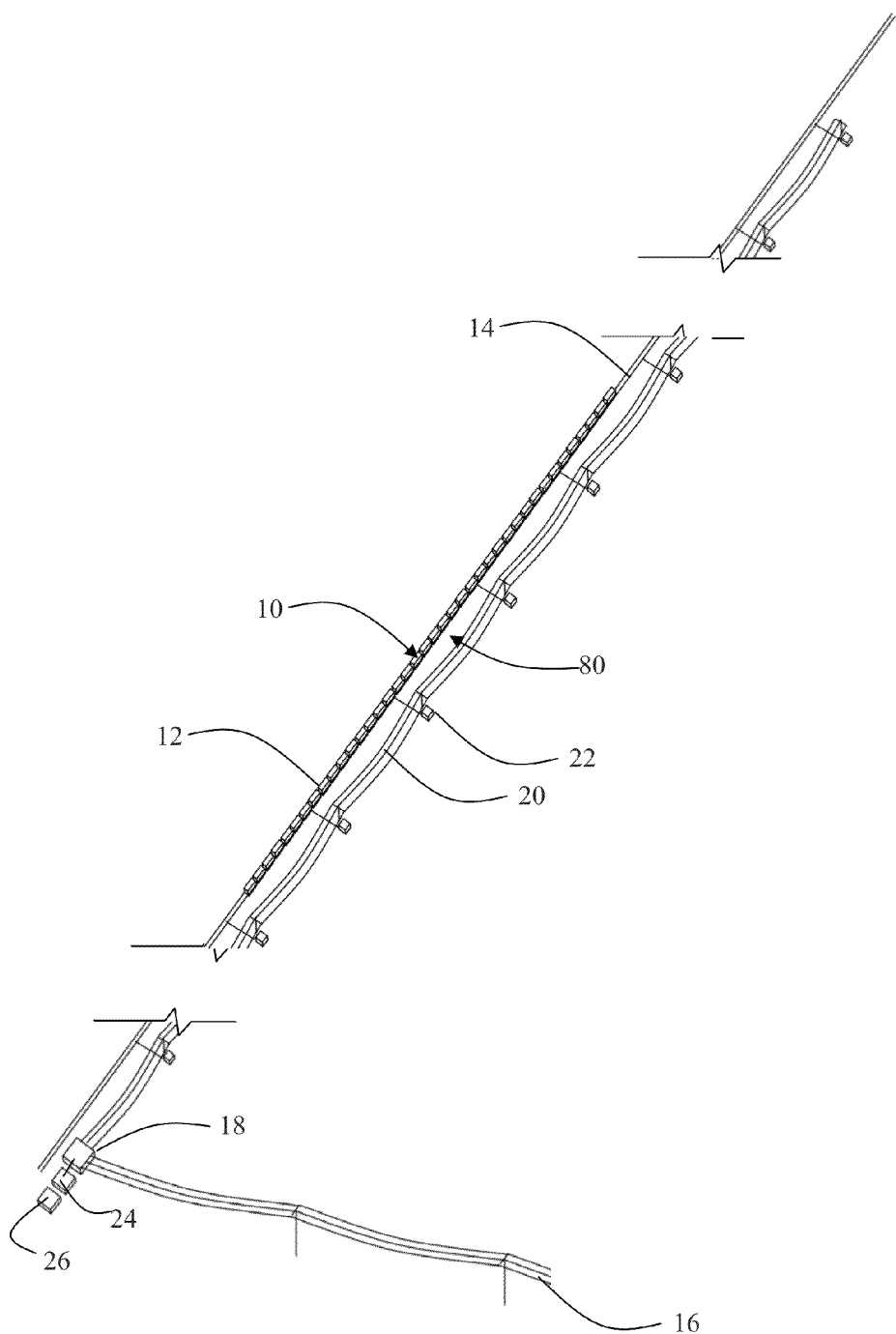
FIG. 1 is a pictorial view of a first embodiment employing a single energy conversion shuttle unit train.

The embodiments to be described provide a system for supplying ancillary services to a utility grid. A first embodiment shown in FIG. 1 employs an electrically powered energy conversion train 10 having multiple shuttle units 12 which are positioned on an inclined track 14. The system is connected to the local electricity grid via a connection system having wires 16 connected to an electric substation 18 and distributed through trackside AC electrical distribution lines 20 and transformers 22 which provide power interconnection at intervals to power supply rails or "third rails" which provide connection to the shuttle units. Details of design and interconnection of the third rails and general system operation may be as defined in U.S. patent application Ser. No. 12/852,504 entitled Utility Scale Electric Energy Storage System filed on Aug. 8, 2010 having a common assignee with the present application the disclosure of which is incorporated herein by reference as though fully set forth. An independent supplemental power generator 24 may be provided on site for providing system power without impact to the grid as will be described in greater detail subsequently. A control system 26 employing supervisory control and data acquisition (SCADA) software provides overall control of the system.

Figure 2A:
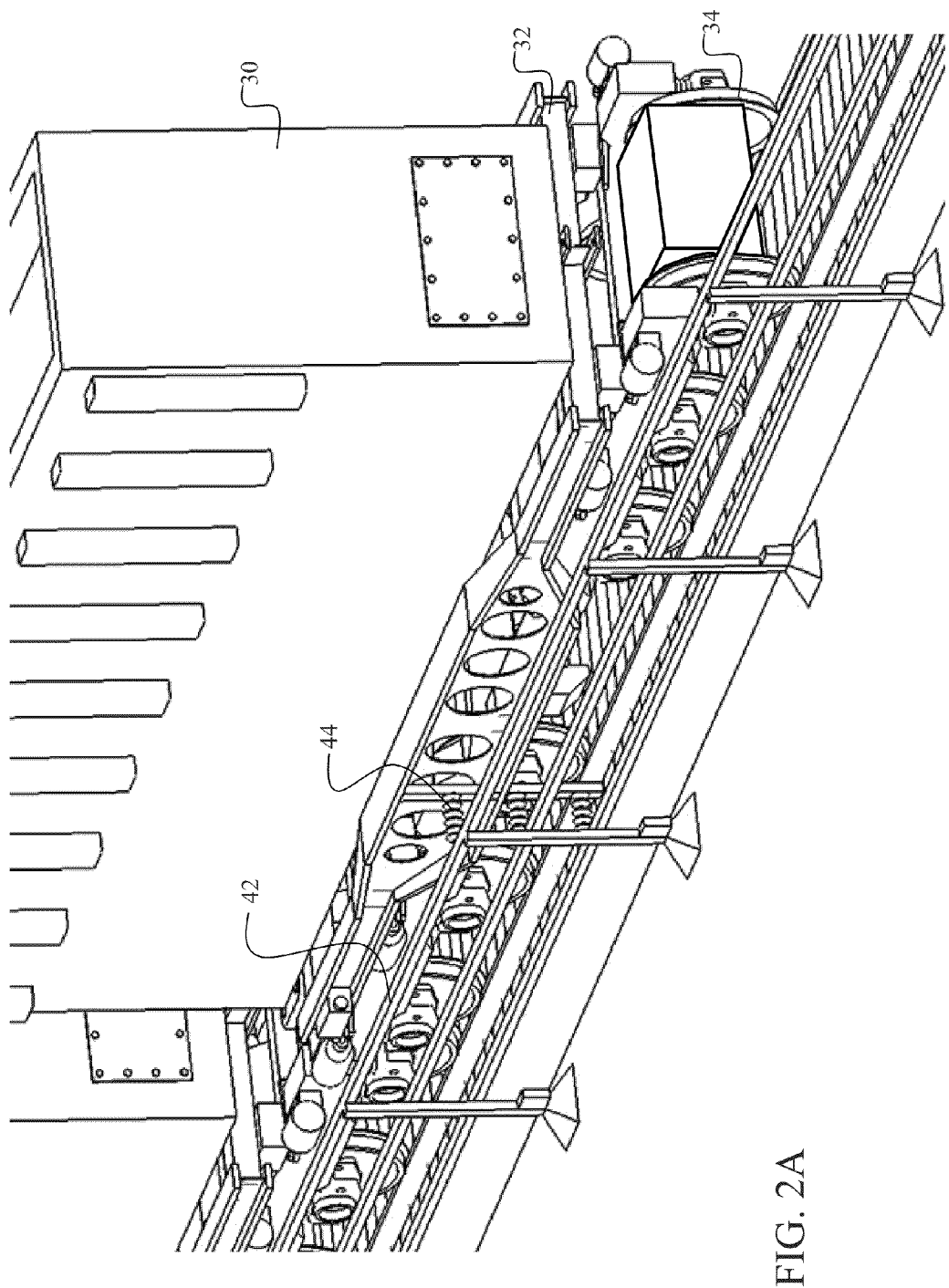
FIG. 2A is a pictorial view of an example shuttle for use as an energy conversion unit.

The shuttle units shown in detail in FIG. 2A are electrically operated and incorporate heavy masses 30 supported on rail chassis 32 with powered trucks 34, comparable to those in current use on diesel-electric locomotives, which use reversible electric motor-generators as traction motors for carrying masses up the track grade and as generators for dynamic regenerative braking while carrying masses down the track grade. For the exemplary embodiments described herein, the shuttle units employ railway bogies such as 3-axle radial bogies produced by Electro-Motive Diesel, Inc. as described in US Patent Publication US 2010/0011984 A1 published Jan. 21, 2010 entitled Self-Steering Radial Bogie. Standard braking systems 36 employing pneumatic, hydraulic or electric actuation may be employed for mechanical braking of the shuttle units in certain operations as described in greater detail subsequently.

Figure 2B:
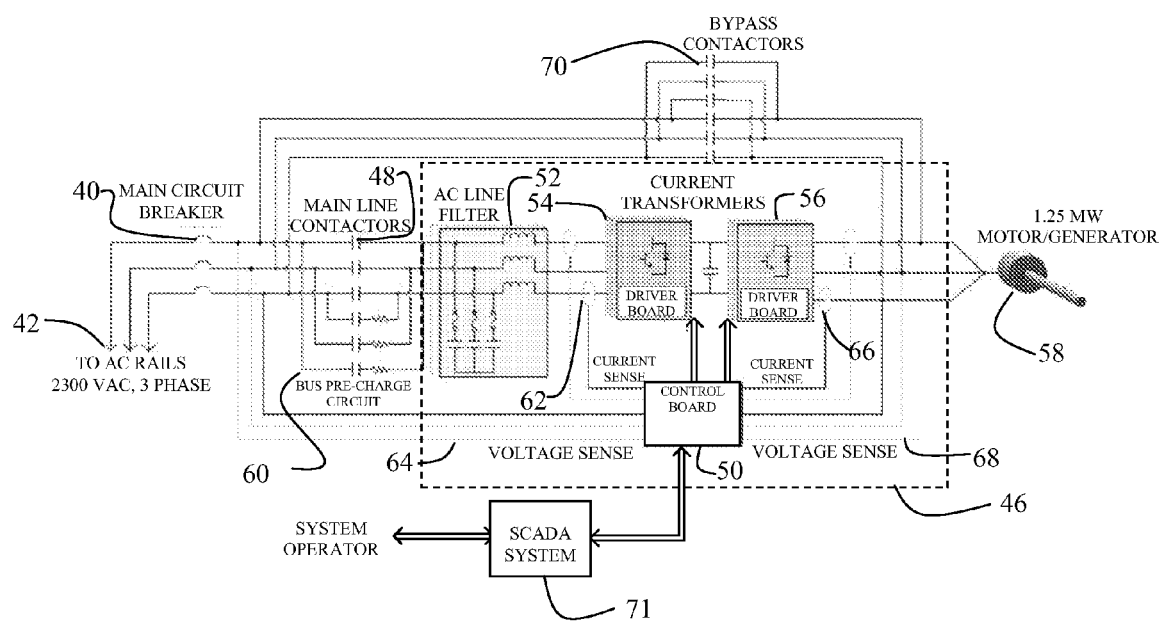
FIG. 2B is a schematic diagram of exemplary on-board operating elements for the energy conversion shuttle unit.

An example on-board electrical system for the shuttle units is shown in FIG. 2B. The trackside power system (for the embodiments shown being 3-phase 2300 VAC) is connected to the electrified shuttle unit through the main circuit breakers 40 to power supply rails 42 (shown in FIG. 2A). Contactors 44 (shown in FIG. 2A) on the shuttle unit connect to the traction control unit (TCU) 46. Main line contactors 48 controlled by the TCU control board 50, described in greater detail subsequently, interconnect to the power supply rail contactors with power conditioning through an AC line filter 52 to a first utility side 3-level active rectifier/inverter 54. For the embodiments shown, an insulated gate bipolar transistor (IGBT) circuit is employed. A second generator side 3-level active rectifier/inverter 56 transfers power to (or from) the motor/generators 58. In the embodiment shown a combined motor/generator unit is employed however in alternative embodiments, separate motor and generator units may be employed and for description herein are encompassed in the term motor/generator. A bus pre-charge circuit 60 also commanded by the control board is provided. Current sensors 62 and voltage sensors 64 are employed by the control board for sensing and control of the trackside power system side of the rectifier inverters and current sensors 66 and voltage sensors 68 are employed by the control board for sensing and control of the motor/generator power. The control board provides acceleration, deceleration and trimming control of the motor/generators as will be described in greater detail subsequently.

Bypass contactors 70 are provided for direct connection of the motor/generator to the trackside power system for synchronous operation at the predetermined control speed for the shuttle unit. Acceleration of the shuttle unit to the control speed is accomplished through the IGBT rectifier/inverter circuits at which time, absent trimming control requirements, the control board engages the appropriate bypass contactors for synchronous operation. When required, the control board reengages the IBGT rectifier/inverter circuits, disconnecting the bypass contactors, for deceleration of the shuttle unit or grid trimming requirements as will be described in greater detail subsequently. Control interconnection by SCADA software 71 in the control center 26 (seen in FIG. 1) is accomplished with each shuttle unit control board. Operational control of the shuttle unit is then accomplished by the TCU control board 50. Both the control center and TCU control board employ at least one processor with a memory for software instructions modules. The software may be implemented through firmware in read only memories, application specific integrated circuits (ASICs) or field programmable gate arrays (FPGAs) and selection of centralized processing at the control center or distributed processing in the individual control boards for the operational steps described subsequently may be determined based individual operational implementations. For certain embodiments all programming may be accomplished on one or more central servers with the functions of the control center and control boards accomplished as clients to the server through internet connection.

Figure 2C:
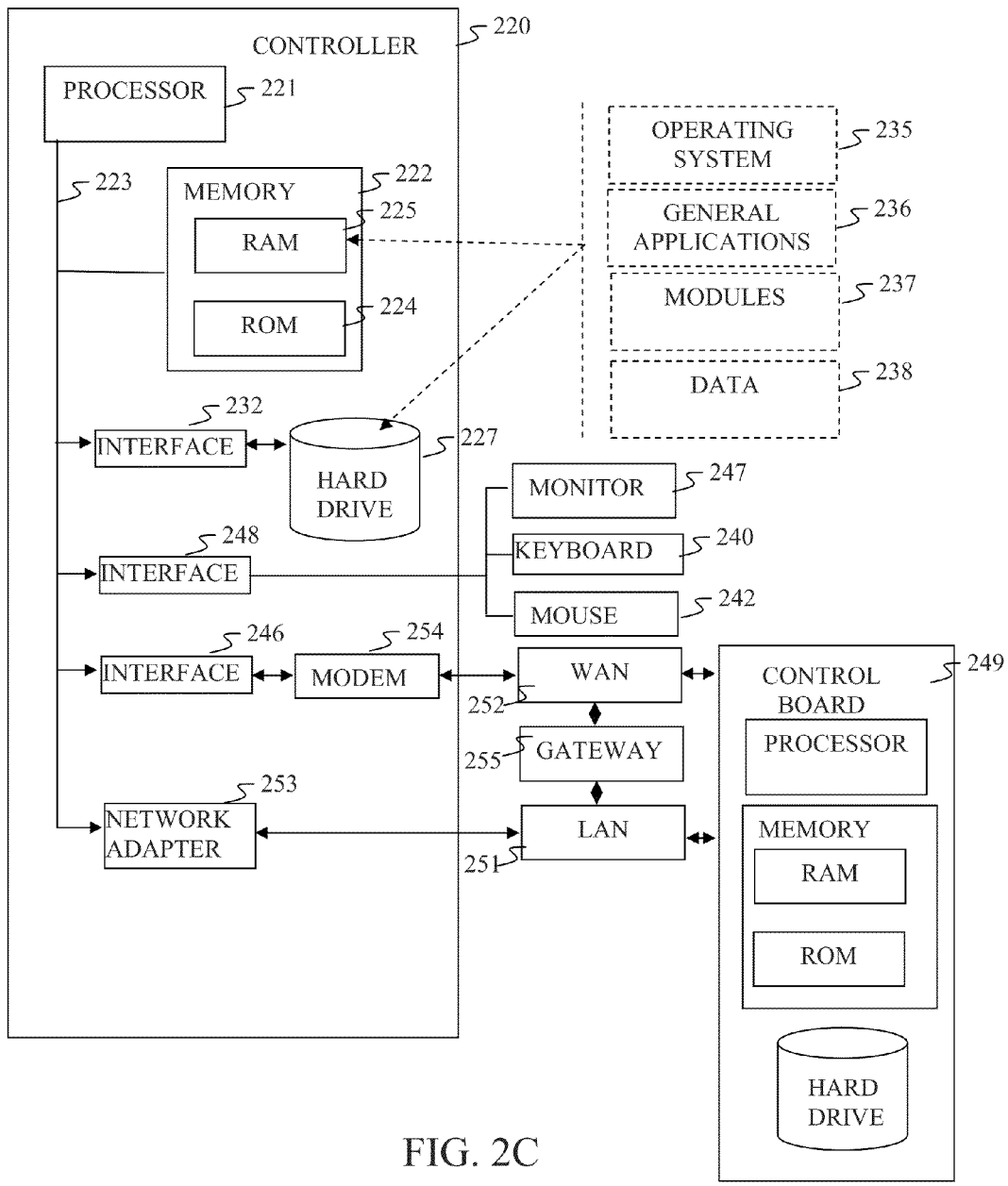
FIG. 2C is a block diagram of an example computer operating system for the present embodiments.

An example computing environment for implementation of the control center and control board operations is shown in FIG. 2C. A controller 220 (which may be a general purpose computer such as personal computers, laptops, servers, mainframes, and other variety computers) includes a processor 221, a memory 222, and a system bus 223 that couples various system components including the system memory to the processing unit 221. The processor may be any of various commercially available processors, including Intel x86, Pentium and compatible microprocessors from Intel and others; and the PowerPC from IBM and Motorola. Dual microprocessors and other multi-processor architectures also can be used.

The system bus may be any of several types of bus structure including a memory bus or memory controller, a peripheral bus, and a local bus using any of a variety of conventional bus architectures such as PCI, VESA, AGP, Microchannel, ISA and EISA. The system memory may include read only memory (ROM) 224 and random access memory (RAM) 225. A basic input/output system (BIOS), containing the basic routines that help to transfer information between elements within the computer 220, such as during start-up, is stored in ROM 224.

The controller 220 further includes a hard disk drive 227 (and/or other data storage media drives) connected to the system bus 223 by a interface 232. The drive and provides nonvolatile storage of data, data structures, computer-executable instructions, etc, for the computer 220. Although the description of computer-readable media above refers to a hard disk, those skilled in the art will recognize other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application programs 236, program modules 237 for the SCADA system as described.

A user may enter commands and information into the controller 220 through a keyboard 240 and pointing device, such as a mouse 242. These and other input devices are often connected to the processing unit 221 through interface 246 that is coupled to the system bus. A monitor 247 or other type of display device is also connected to the system bus 223 via the interface, such as a video adapter.

The controller 220 operates may operate in a networked environment using logical connections to one or more remote computers including the control boards on the individual shuttle units, exemplified as remote computer 249. The remote computer or control board 249 may be a server, a router, a peer device or other common network node, and typically includes many or all of the elements described relative to the controller 220. The logical connections depicted include a local area network (LAN) 251 and a wide area network (WAN) 252. Such networking environments are commonplace in enterprise-wide computer networks, intranets and the Internet.

When used in a LAN networking environment, the controller 220 is connected to the local network 251 through a network interface or adapter 253. When used in a WAN networking environment, the controller 220 typically includes a modem 254 or other means for establishing communications (e.g., via the LAN 251 and a gateway or proxy server 255) over the wide area network 252, such as the Internet. The modem 254, which may be internal or external, is connected to the system bus 223 via interface 246. In a networked environment, program modules depicted relative to the controller 220, or portions thereof, may be stored in the remote memory storage device. It will be appreciated that the network connections shown are exemplary and other means of establishing a communications link between the processors may be used.

The control center is in communication with utility companies, independent system operators (ISOs) or other grid operators controlling the utility grid for providing response to ancillary service commands including automatic generation control. Modules in the SCADA software provide for instructions to the TCU control board for modifying the force created by the motor/generator relative to the gravitational force exerted on one or more shuttle units on the inclined grade of the track to absorb from or provide power to the utility grid, as will be described in greater detail subsequently. Instructions in the software modules provide for increasing the force in an uphill direction responsive to a regulation down command, which may result in increasing velocity of the shuttle unit up the incline or decreasing velocity of the shuttle unit down the incline, or for increasing the force in a downhill direction (reducing the force in the uphill direction) responsive to a regulation up command, which may result in increasing velocity of the shuttle unit down the incline or decreasing velocity of the shuttle up the incline. At force balance points, ideally at a velocity providing synchronous operation with the grid as will be described subsequently, power is absorbed from the utility grid with the motor/generator acting as a motor driving the shuttle units up the track grade or provided to the utility grid with the motor/generator acting as a generator providing regenerative braking both with maximum efficiency.

For an example embodiment a 10% grade is employed for the track with a track length of 3.8 miles resulting in a vertical elevation differential of 2028 ft. With 40 shuttle units each having a weight of approximately 300 tons, the system can provide approximately 30 MW average power and over 16.5 MW-hr of energy storage. In alternative embodiments, grade (elevation change) and total track length may be modified to accommodate specific regulation requirements and/or geographic features associated with the location of the system. Other example embodiments could operate on grades ranging from 0 to 20% or more with system lengths up to 10 miles and from 1 to 300 shuttle unit cars operating. Such embodiments could operate up to 8 hrs duration and power levels up to 200 MW. Grades above 12% may require use of a center "Rack Rail".

Distributing the overall weight of the train into individually powered shuttle units provides high adhesion and the very high mass of the individual shuttle units allows high tractive effort for each unit resulting in high efficiency of the system.

Returning to FIG. 1, the train 10 is positioned initially at a central queue location 80 on track 14. Upon receipt of a regulation down command from a utility or other grid system operator, power is drawn from the grid through distribution lines 20 and transformers 22 to drive the motor/generators 58 in motor mode to drive the train 10 up the track 14 and thereby regulate the power of the grid. A train with 240 motor driven axles would increase individual power provided to the axles by 100 kW to respond to a 24 MW regulation down command. The system of the example embodiment can absorb 30 MW for a period of 30 minutes based on the defined track length. The movement of the train 10 up the inclined track converts electricity into recoverable potential energy which may then be used to generate electricity in response to regulation up commands. By varying the speed of the train the power level can be varied from zero to maximum.

Upon receipt of a regulation up command from a utility, the train is allowed to accelerate down the track incline with regenerative braking by the motor generators 58 in generator mode providing power through transformers 22 and distribution lines 20 and to the grid through electric substation 18. The example train with 240 motor driven axles would increase individual power provided by each axle 100 kW to respond to a 24 MW regulation up command.

Figure 3A:
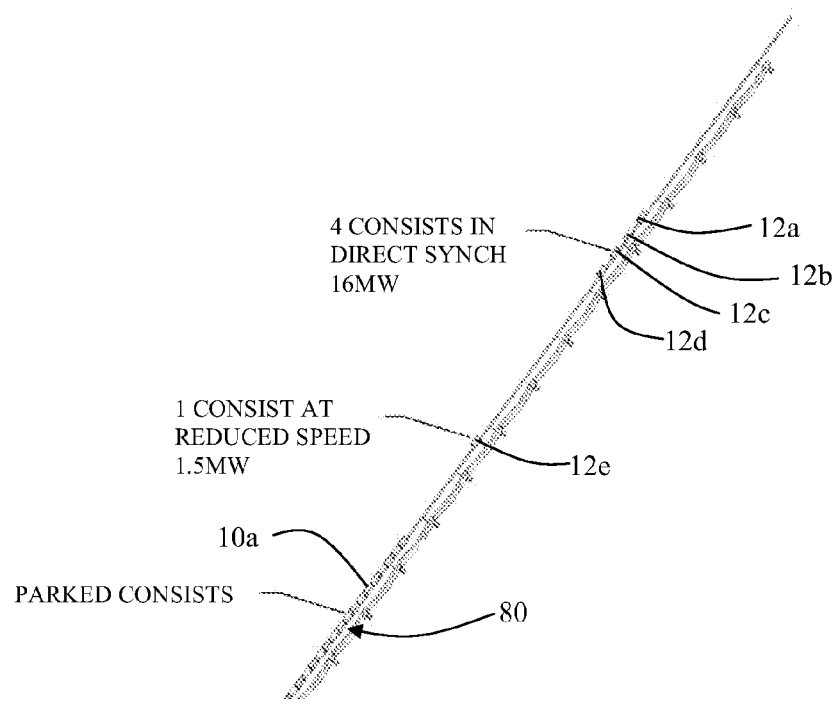
FIGS. 3A and 3B are pictorial views of a second embodiment employing multiple energy conversion units with depicted operation in response to a regulation down operation.

For improved granularity of control capability for the system while allowing some shuttle units to operate at a fixed speed in direct synchronization to the utility grid, the individual shuttle units may be employed alone or in groups as consists with two or more shuttle units for operation in a second embodiment. The power of the system is varied primarily by the number of cars operating instead of the speed of the cars as in the first embodiment. Formation of consists may include physical interconnection through standard coupling techniques well known in the art or by parallel operation of adjacent shuttle units. In alternative embodiments, consists may be formed from one or more powered shuttle units and one or more unpowered shuttle units coupled to the powered units. As shown in FIG. 3A a grouping of shuttle units or consists 10a rests at the central queue 80. Upon receiving a regulation down command from the utility from a system stopped condition, the control system SCADA dispatches a number of shuttle units based on the regulation power consumption required. Four shuttle units, each consuming 2.5 MW, could satisfy a 10 MW regulation down command. As shown in FIG. 3A, four shuttle units 12a, 12b, 12c and 12d are dispatched. The shuttle units are accelerated to synchronous speed to provide regulation of the grid at near the requested power and the power conversion equipment is bypassed to increase efficiency. One or more additional shuttle units (designated 12e in FIG. 3A) may be dispatched and maintained in asynchronous operation (for example at 1.5 MW) for trimming of the actual power absorption requested by the system.

For the embodiments described, the motor/generators are geared to the drive wheels for optimum operation at approximately 7 mph with the frequency of the motor/generators at a synchronous frequency with power in the grid. At the synchronous speed, the bypass contactors are engaged after acceleration (or disengaged for deceleration) and losses from some of the power conversion equipment is eliminated.

Figure 3B:
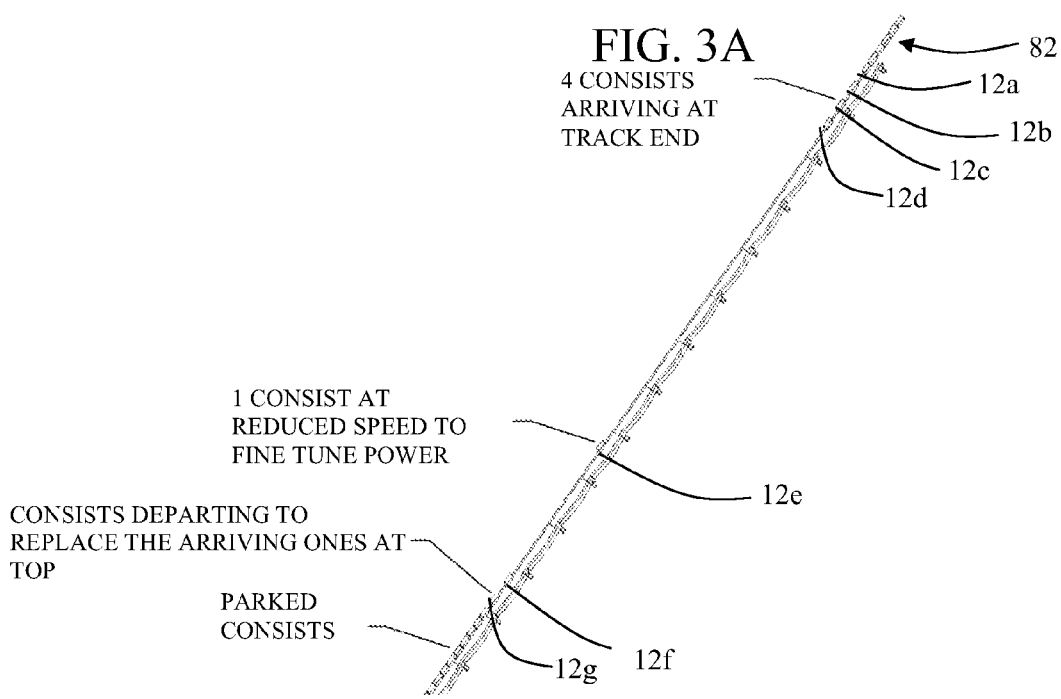

As the moving shuttle units 12a-12d approach an upper queue area 82 near the summit of the track, as shown in FIG. 3B, bypassing contactors in the shuttle units are disconnected allowing the shuttle units to be decelerated and parked. Additional shuttle units 12f, 12g are dispatched from the central queue to maintain the required regulation power; accelerating at a rate comparable to the deceleration rate of the upper shuttle units for even power demand. Some of the additional shuttle units, as well as any previously operating leading units are then converted to synchronous operation when reaching synchronous speed. Shuttle units not converted to synchronous operation are employed for trimming as previously described.

If the null regulation condition is considered to be the completion of a regulation command, a regulation down command can be performed by reducing, or stopping the downhill speed of some or all of the shuttle units if the system is producing power or accelerating shuttle units uphill from a stopped condition or accelerating shuttle units uphill from an existing power storage condition or any combination of these operations.

While highest efficiency is achieved operating at synchronous speed with the power conversion equipment bypassed, the motor/generators in the system may be sized to allow operation at above synchronous speed, individually or for all units operating, for increased power capacity if required by the utility for grid regulation.

Figure 4A:
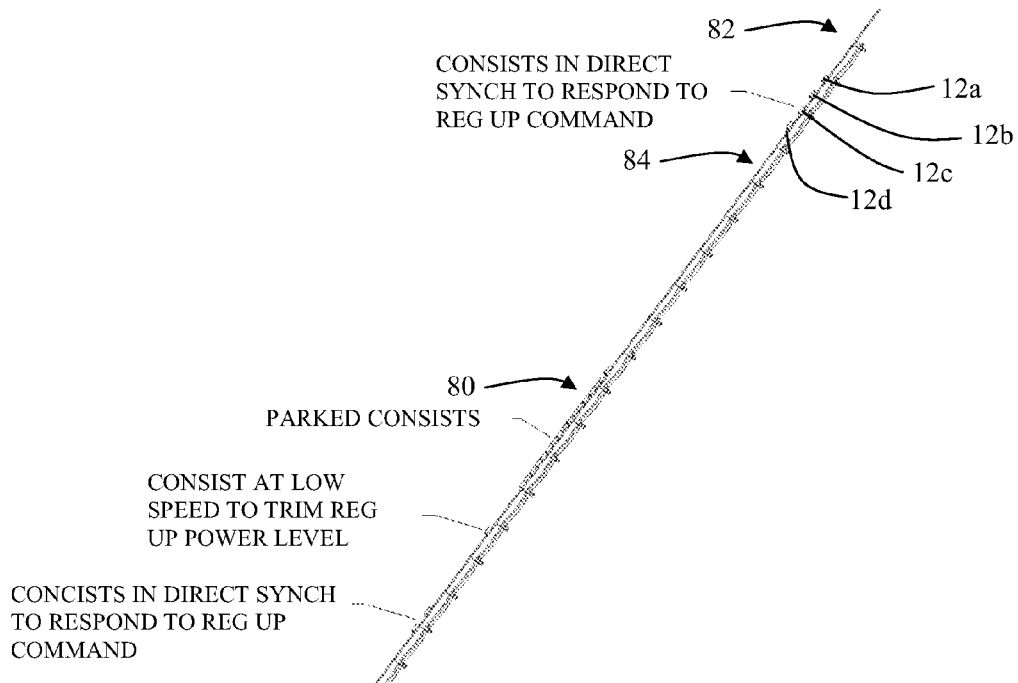
FIGS. 4A and 4B are pictorial views of the second embodiment showing operation during a regulation up operation.
Figure 4B:
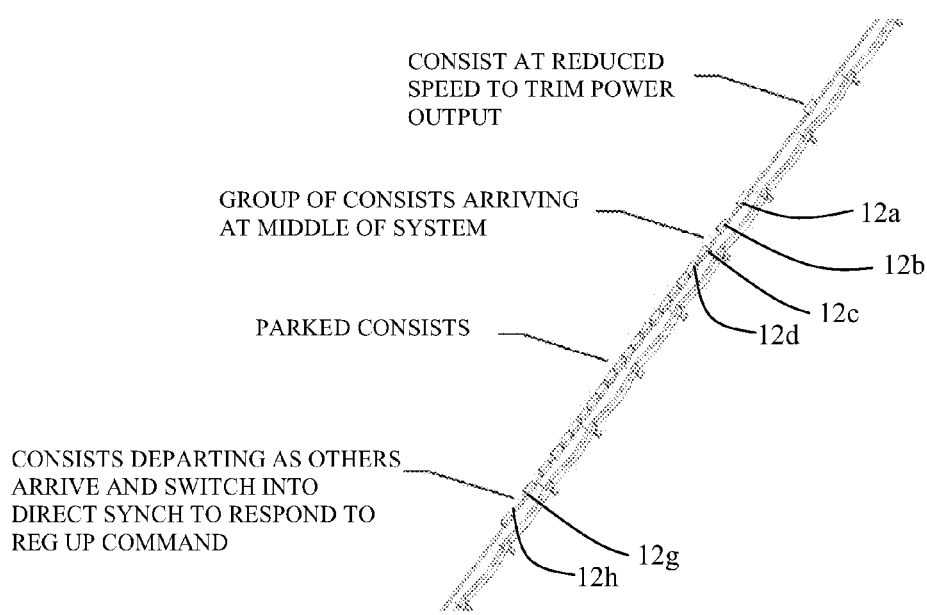

Response of the second embodiment to a regulation up command from a stopped condition is shown in FIGS. 4A and 4B. If shuttle units are present in the upper queue 82, or upper mid grade 84, as a result of regulation down operation, some or all of those shuttle units (12a, 12b, 12c, and 12d in FIG. 4A) are allowed to accelerate down the track to synchronous speed and maintained at that speed using regenerative braking by the motor/generators in each shuttle. Power is supplied to the grid from the motor/generators through the trackside power system with transformers 22 and transmission lines 20 to substation 18. As with the regulation down response, one or more of the shuttle units may be operated asynchronously to trim desired output. If no shuttle units are present in the upper queue or upper mid grade or additional power is needed, shuttle units are dispatched from the central queue down slope toward the lower track terminus.

As shown in FIG. 4B, as shuttle units begin to arrive at the central queue from above or at a queue at the lower track terminus, shuttle units (designated 12g and 12h) are dispatched from the central queue to maintain the regulation up power provided. As with the regulation down command, if the null regulation condition is considered to be the completion of a regulation command, a regulation up command can be performed by reducing, or stopping the uphill speed of some or all of the shuttle units if the system is storing power or accelerating shuttle units downhill from a stopped condition or accelerating shuttle units downhill from an existing power generation condition or any combination of these operations.

For the embodiment described, a single central queue has been shown. In alternative embodiments, multiple queues intermediate the tower terminus and summit of the track may be employed with downward and upward transitions through the queues as described.

During regulation system operation it may be desirable to have the majority of shuttle units operating at synchronous speed to minimize the electric losses caused by variable speed power conversion equipment. In this type of operation the systems power is adjusted in incremental levels by varying the number of shuttle units in operation instead of varying the power (speed) of the shuttle units in the system. Moving shuttle units will come upon other shuttle units parked on the main track in the central, upper or lower queues. In order to maintain the systems power and minimize undesirable transients, the energy from the shuttle unit approaching a parked shuttle unit that will be slowed and parked must be transferred to another shuttle unit accelerating it up to speed so that its power replaces that of the incoming shuttle unit as it is parked. This process is described below with respect to FIG. 5A using a generalized case with shuttle units combined into consists.

For a downhill transition, a consist 90 having four shuttle units is traveling downhill producing power by regenerative braking to fulfill a regulation up command and the traction motor/generators are providing power directly to the electric grid with the motor/generators operating at the grid frequency. As the consist approaches a group of parked consists 92 on the track 10, the traction motor/generators in consist 90 are switched to operate from the power conversion inverter/rectifiers to allow variable speed control. The lower most parked four shuttle units are combined in a consist 94 which is released and allowed to coast downhill acquiring an equivalent amount of energy that will be lost electrically during the transfer of energy from the approaching consist to the departing one. When the departing consist 94 has gained the required energy, the incoming consist 90 is decelerated by increasing its dynamic braking. This increase in electric energy production is balanced by powering the departing consist 94 downhill in a complementary manner thereby keeping the overall power output constant. As the incoming consist 90 is slowed and its power output reduced, the speed of outgoing consist 94 is increasing and its power output is increased maintaining a constant net power output. When the incoming consist 90 comes to rest and is parked, all of its kinetic energy has been transferred to the departing consist 94 and this energy, plus the energy acquired by the departing consist rolling downhill at the start is substantially sufficient to get the departing consist up to synchronous speed at which point the asynchronous speed control electronics are bypassed with the reversible contactors and the consists motor/generators are synchronized directly to the grid. In certain instances, particularly during a power generation mode, limited operation of one or more shuttle units to absorb or supply power may also be employed to help maintain or facilitate a desired operation.

In order to add or maintain the heavy inertia the system adds to the electric grid it may be desirable to not stop all of the shuttle units at one time. To accomplish this only some shuttle units could be stopped and reversed in direction at any given time so that there are always some units in motion during a transition from charging to discharging or vise versa.

The shuttle units in the embodiments described may also be equipped with hydraulically or pneumatically actuated brake systems, as previously described, which may be employed for deceleration of the shuttle units during conditions where deceleration using regenerative braking by the motor/generator would introduce undesirable transients or drive the system outside regulation tolerances.

For uphill transition consist 94 is traveling uphill consuming power from the grid to regulate frequency down. The motor/generators of consist 94 are operating synchronously, in direct synchronization to and powered directly by the electric grid with the motor/generators operating at the fixed grid frequency. As the consist approaches a group of parked consists 92 on the track 10 the motor/generators are switched to operate asynchronously using the power conversion inverters to allow variable speed control and the power to the motor/generators is reduced causing the consist 94 to decelerate. At the same time the upper most consist 90 in the group of parked consists begins to accelerate uphill consuming an equivalent amount of power to that being reduced for the incoming consist. In this way the net power consumption remains constant. As the incoming consist continues to reduce its power consumption due to its reducing speed, the departing consists power consumption increases on a complementary manner due to its speed and acceleration to maintain a constant power consumption. At the time that the incoming consist comes to a stop and is parked, its kinetic energy and power consumption has been transferred to the departing consist. Due to electric tosses, the departing consist will not be up to the synchronous grid frequency speed yet and it will continue to accelerate until it is up to synchronous speed at which point the speed control electronics are bypassed and the consists motor/generators are synchronized and powered directly by the electric grid. Power can be maintained at a desired level during this operation by changing the speed of a shuttle unit operating asynchronously.

Figure 5A:
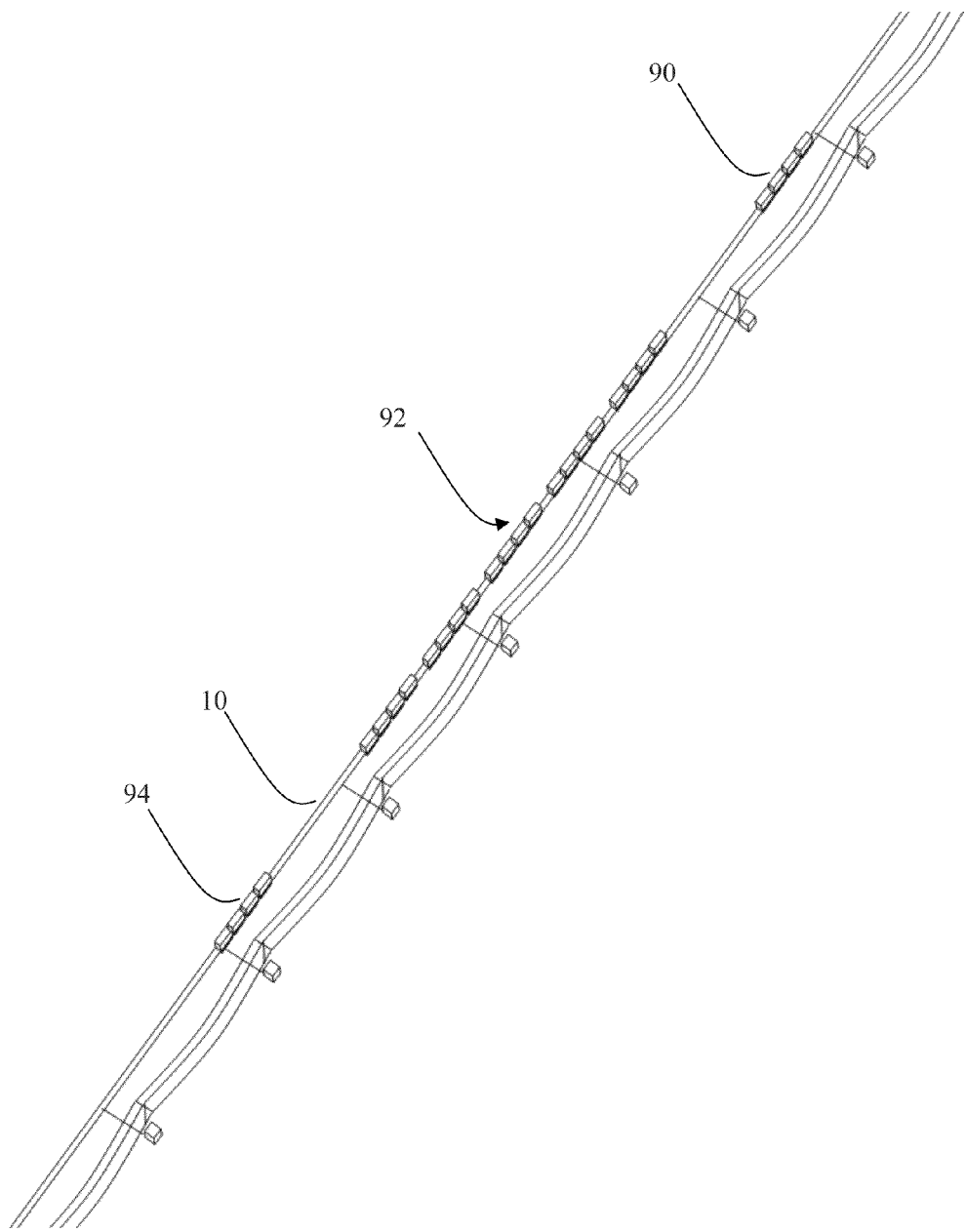
FIG. 5A is a pictorial view of the second embodiment showing operation during a regulation operation with energy absorbers.
Figure 5B:
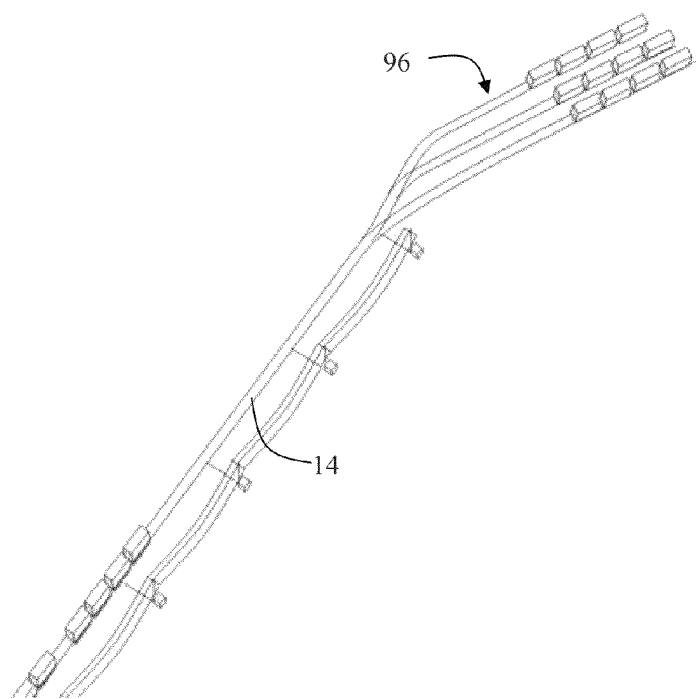
FIG. 5B is a pictorial view of track-end reserve energy conversion unit parking.

Topography of a site employing the system as described with respect to FIG. 5A may have limited vertical elevation capability. To allow use of all available elevation differential of the inclined track 14, a top parking length 96 may be provided with no or reduced incline and a length sufficient to receive all or most of the shuttle units in the system as shown in FIG. 5B. Similarly a bottom parking length may be provided with no or reduced incline and a length sufficient to receive all or most of the shuttle units in the system. With these parking lengths, additional available sloped section of the track may be employed for regulation by all shuttle units in the system. The parking lengths may incorporate multiple sections of track with switched connection to the summit and bottom of the main portion of the track operating on the sloping grade.

Figure 6:
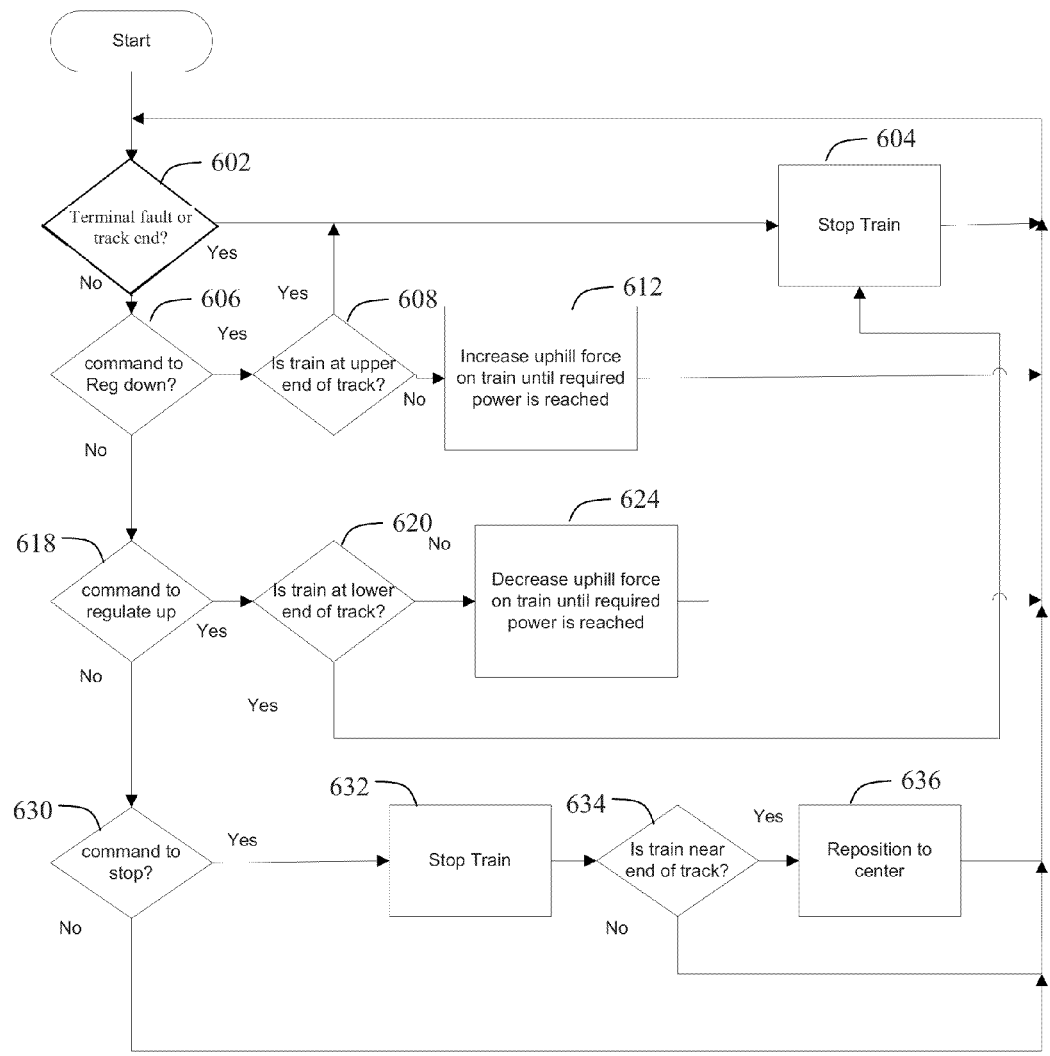
FIG. 6 is a flow chart of operation for the first embodiment described in regulation up and regulation down.
Figure 7A:
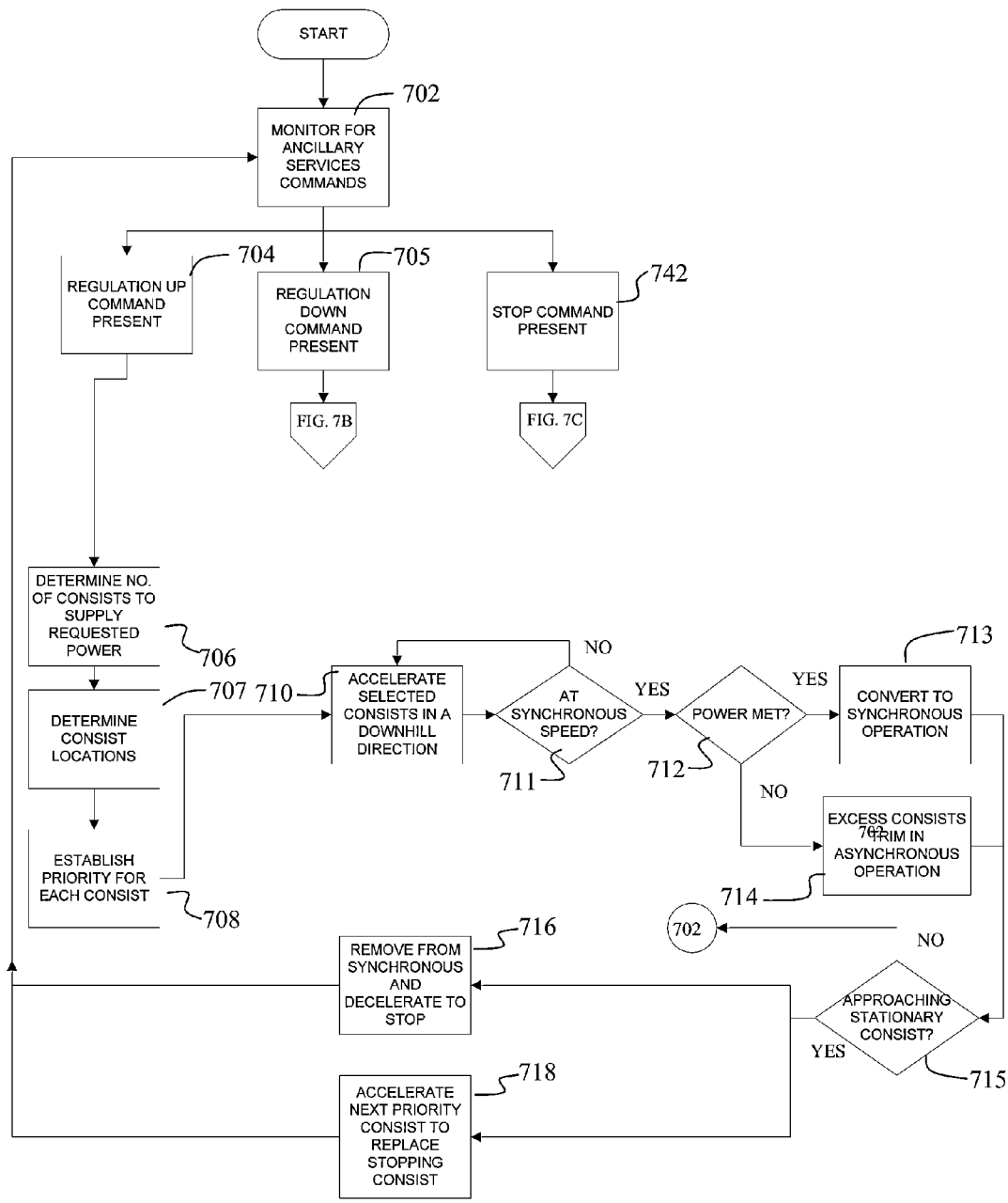
FIGS. 7A-7C are flow charts of operation for the second embodiment described in regulation up and regulation down.
Figure 7B:
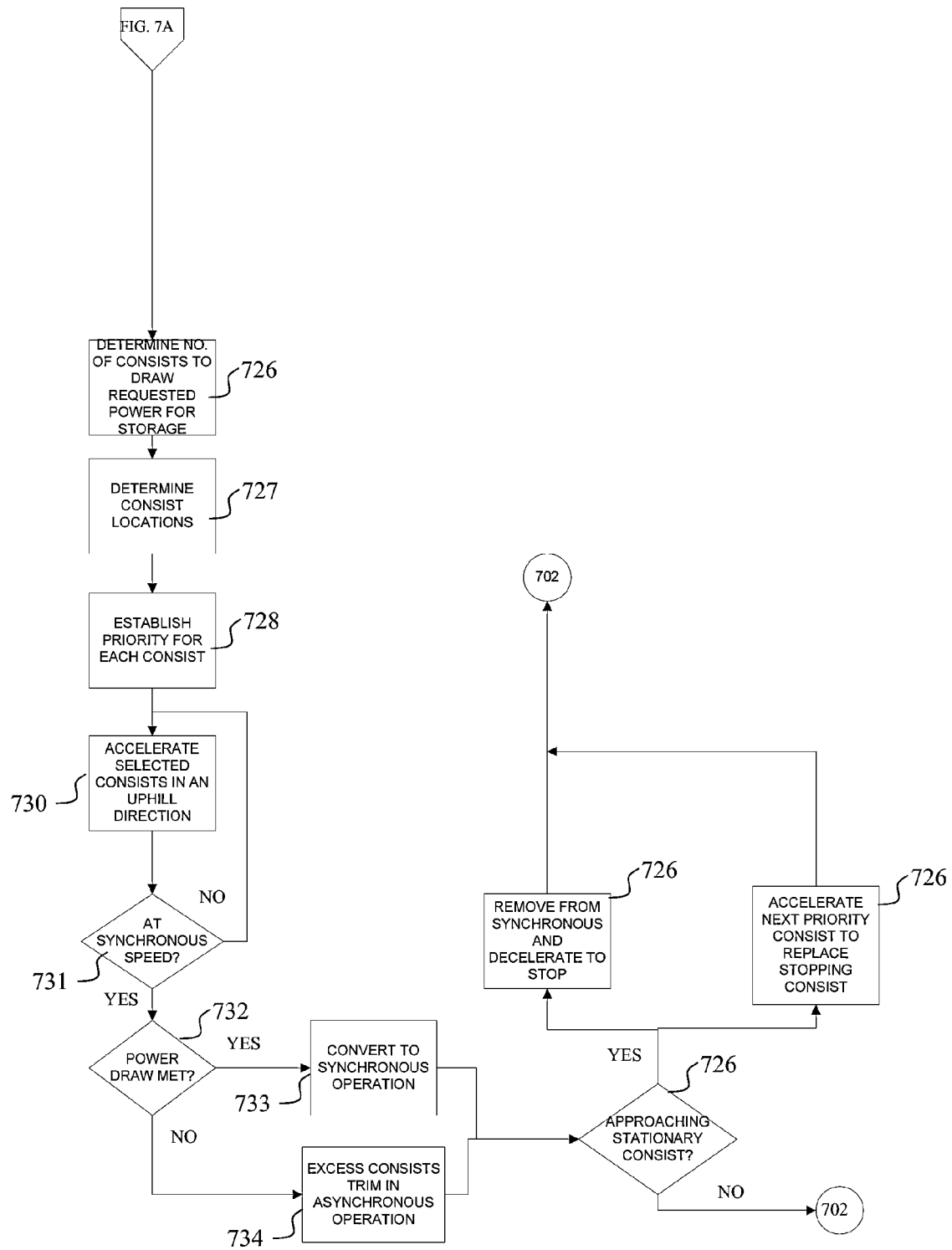
Figure 7C:
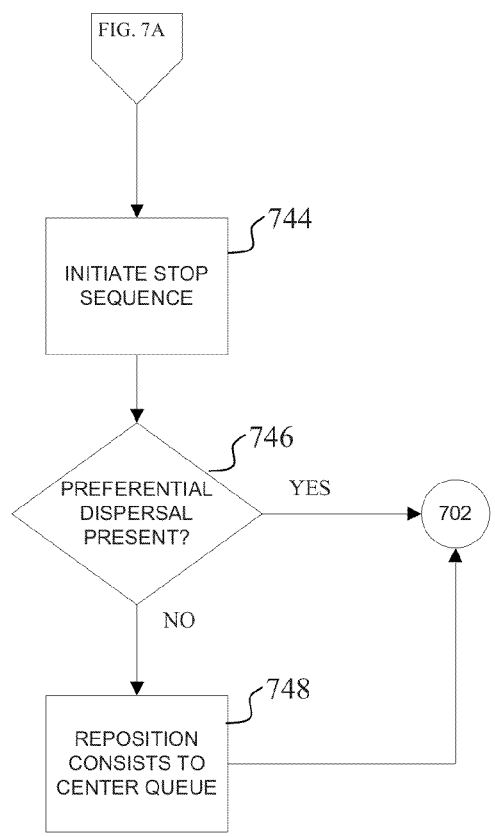

SCADA software for control of the shuttle units in the system operates for the regulation up and regulation down capability of the system as shown in FIGS. 6-7C. As shown in FIG. 6 for the first embodiment, the SCADA monitors for any terminal fault present in the train system or approach of the train to a track end, step 602 and if either case is present, the SCADA initiates the train stop sequence, step 604. If a stop is initiated for presence of the train at a track end, the following sequence will monitor for the presence of a regulation down command (step 606 below) if the train is stopped at the track bottom or a regulation up command (step 618 below). The SCADA then monitors for commands from the utility or independent system operator (ISO) to which ancillary services are being offered. If a command is present for regulation down, step 606, the SCADA determines if the train is at the upper terminus of the track, step 608, if so, a train stop sequence is initiated, step 604, if needed. Otherwise, the SCADA operates the train with the motor/generator increasing the uphill force on the train (alternatively viewed as creating an acceleration with a vector in the uphill direction) until the power requirement of the regulation down command is met, step 612. This may require operating in motor mode increasing absorbed power from the grid to drive the train up the grade or operating in generator mode but reducing the amount of power provided to the grid with speed of the train determined based on the power requirement of the regulation down command.

Returning to step 606 if no regulation down command is present, the SCADA monitors for a regulation up command, step 618, and if present, the SCADA determines if the train is at the lower terminus of the track, step 620, and if so, a train stop sequence is initiated, step 604, if needed. Otherwise, the SCADA operates the train with the motor/generator decreasing the uphill force on the train (alternatively viewed as creating an acceleration with a vector in the downhill direction) until the power requirement of the regulation up command is met, step 624. This may require operating in generator mode increasing amount of power provided to the grid or operating in motor mode but reducing the absorbed power from the grid to drive the train up the grade with speed of the train determined based on the power requirement of the regulation down command.

If at any time during operation a stop command (no regulation up or regulation down) is received, step 630, the SCADA initiates a stop sequence, step 632. If regulation condition allow, the stop may be generated by deceleration created by a reversal of motor/generator mode. If regulation condition requires no input to or extraction of power from the grid, power may be removed from the motor/generator systems of the train and mechanical braking employed to stop the train.

With the train in the stopped condition, the SCADA determines if the train is positioned near a terminus of the track, step 634. If so, the train may be repositioned at near track center, step 636, for optimum response to either regulation up or regulation down commands. If above track center, gravity acceleration of the train with deceleration by mechanical braking may be employed without any grid impact.

Operation of the second embodiment is shown in FIGS. 7A-7C. As shown beginning in FIG. 7A, the SCADA monitors for ancillary services commands from the utility or ISO, step 702. If a command for regulation up is present, step 704, the SCADA determines number of consists required to supply power required consistent with the regulation up command, step 706. The location of all consists in the system is determined, step 707, and, a priority established for regulation up usage, step 708, with highest priority to consists present above the central queue from lowest to highest, next priority for at the bottom of the central queue and lowest priority to consists below the central queue. Selected by the SCADA based on the established priority, one or more consists decreases its uphill force on the consists (alternatively viewed as creating an acceleration with a vector in the downhill direction) changing the power to the grid by changing the rate of potential energy gain or loss of the consists, step 710. Upon reaching a predetermined synchronous operating speed, step 711, if the power has not yet been met, step 712, each operating consist is switched to synchronous operation for maximum efficiency, step 713. When desired power is reached any moving consist not at synchronous speed is maintained in asynchronous operation with regulation of speed to trim the required power, step 714.

Any consist approaching a stationary consist or termination of the track, step 715, is removed from synchronous operation, if required, and decelerated to stop prior to reaching the stationary obstruction, step 716. Any next priority consist is accelerated contemporaneously to replace the power of the stopping consist, step 718. If there is a consist operating at reduced speed for trimming purposes and that may be in conflict with an overtaking synchronous speed consist its trimming function may be transferred to a trailing consist that has no such conflict. Adjustment of regulation up commanded power by adding or stopping consists in increments as required for the necessary change is accomplished based on the location priority. Trimming may also be accomplished by varying the speed of moving consists.

Returning to step 702, if a regulation down command is present, step 705, the SCADA determines number of consists required to store power consistent with the regulation down command, step 726 (seen in FIG. 7B). The location of all consists in the system is determined, step 727, and, a priority established for regulation down usage, step 728, with highest priority to consists present below the central queue, next priority for consists at the top of the central queue and lowest priority to consists above the central queue. Selected by the SCADA based on the established priority, one or more consists is accelerated up the grade storing power from the grid by raising the consist up the grade and/or downhill traveling consists slowed, stopped or reversed in direction, step 730. Upon reaching a predetermined synchronous operating speed, step 731, if power has been met, step 732, each operating consist is switched to synchronous operation for maximum efficiency, step 733. When desired power is reached any moving consist not at synchronous speed is maintained in asynchronous operation with regulation of speed to trim the required power, step 734.

It should be noted for conversion in operations from regulation up to regulation down and regulation down to regulation up that priority for the consists is reversed allowing the SCADA to dispatch higher priority consists for the desired operation prior to complete stop of all operating consists in the prior operation for improved response time to the new command.

Returning to step 702, if at any time during operation a stop command (no regulation up or regulation down) is received, step 742 (FIG. 7C), the SCADA initiates a stop sequence, step 744. If regulation conditions allow, the stop may be generated by deceleration created by a reversal of motor/generator mode in the consists. If the regulation condition requires no input to or extraction of power from the grid, power may be removed from the motor/generator systems of the consists and mechanical braking employed to stop.

With the consists in the stopped condition, the SCADA determines if a predetermined preferential dispersal of consists is present, step 746. If not, the consists may be repositioned to the center queue, step 748, for optimum response to either regulation up or regulation down commands. If above the center queue, gravity acceleration of the consists with deceleration by mechanical braking may be employed without any grid impact. If below center queue, independent on site power generation may be employed to provide power in motor mode to position the consists, again without impact to the grid. In a situation with consists in position both above and below the center queue power may be supplied from above queue downhill traveling consists to below queue uphill traveling consists reducing power consumption for repositioning units towards the central queue. Repositioning may alter the starting locations for the queue(s) to bias the starting potential energy of the system for regulation up or regulation down to provide capability for spinning reserves, black start or other particular ancillary services which may be predicted or anticipated.

Figure 8A:
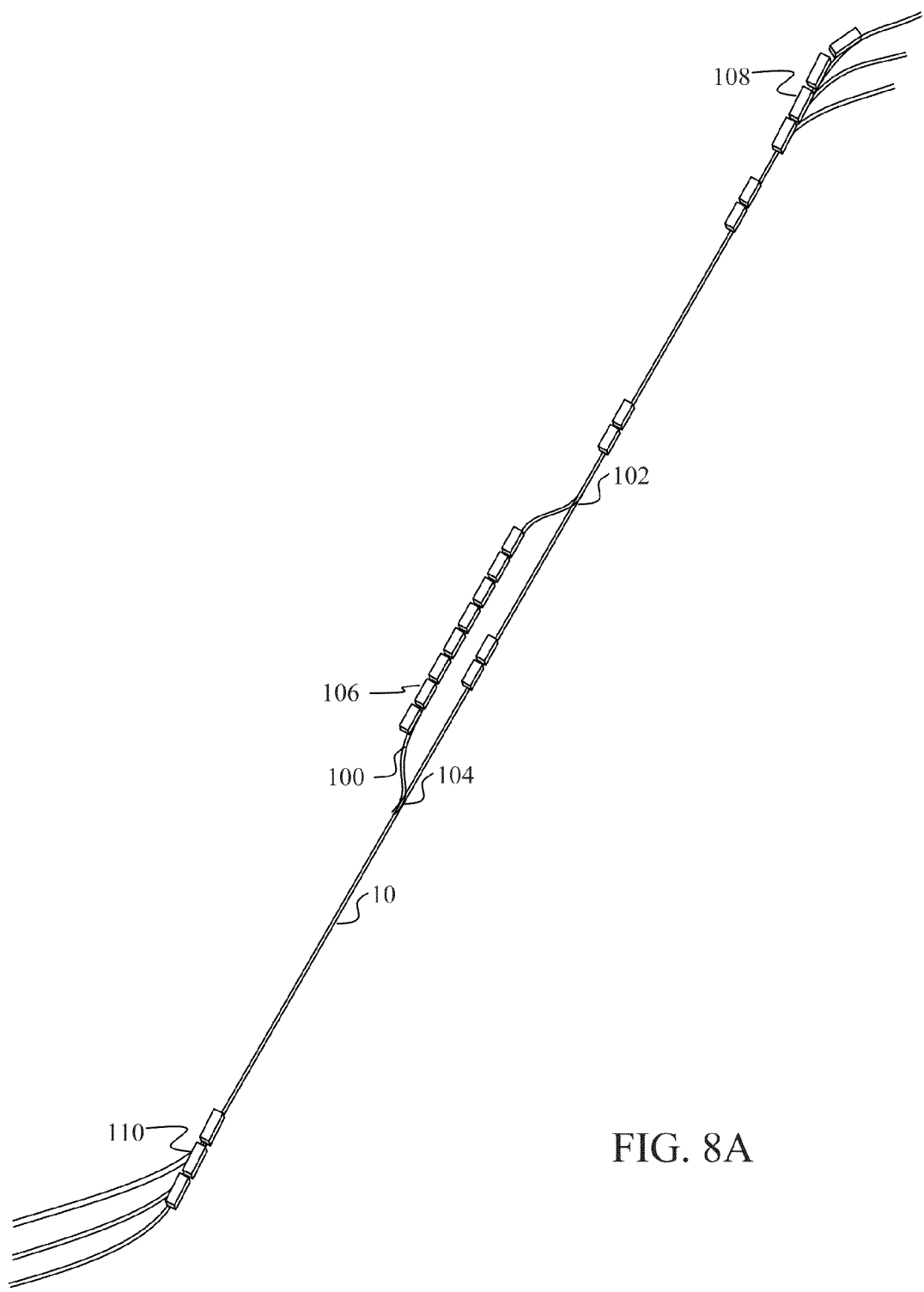
FIG. 8A is a pictorial view of the second embodiment with a passing track segment.

For certain operational requirements it may be desirable to provide capability for shuttle units or consists to bypass the central queue or shuttle units or consists stopped on the main track. A passing track system as shown in FIG. 8A may be employed. A passing track 100 is provided with upper and lower switches 102 and 104, respectively. For the embodiment shown, the central queue 106 is maintained in the passing track and consists operating from either the upper queue 108 or lower queue 110 may bypass the central queue for longer operation without transition or interruption. The control system may then determine based on current and anticipated ancillary service demand whether to withdraw shuttle units from the central queue on the passing track onto the main track by establishing priorities for all units as previously described with respect to the operation of the second embodiment.

Figure 8B:
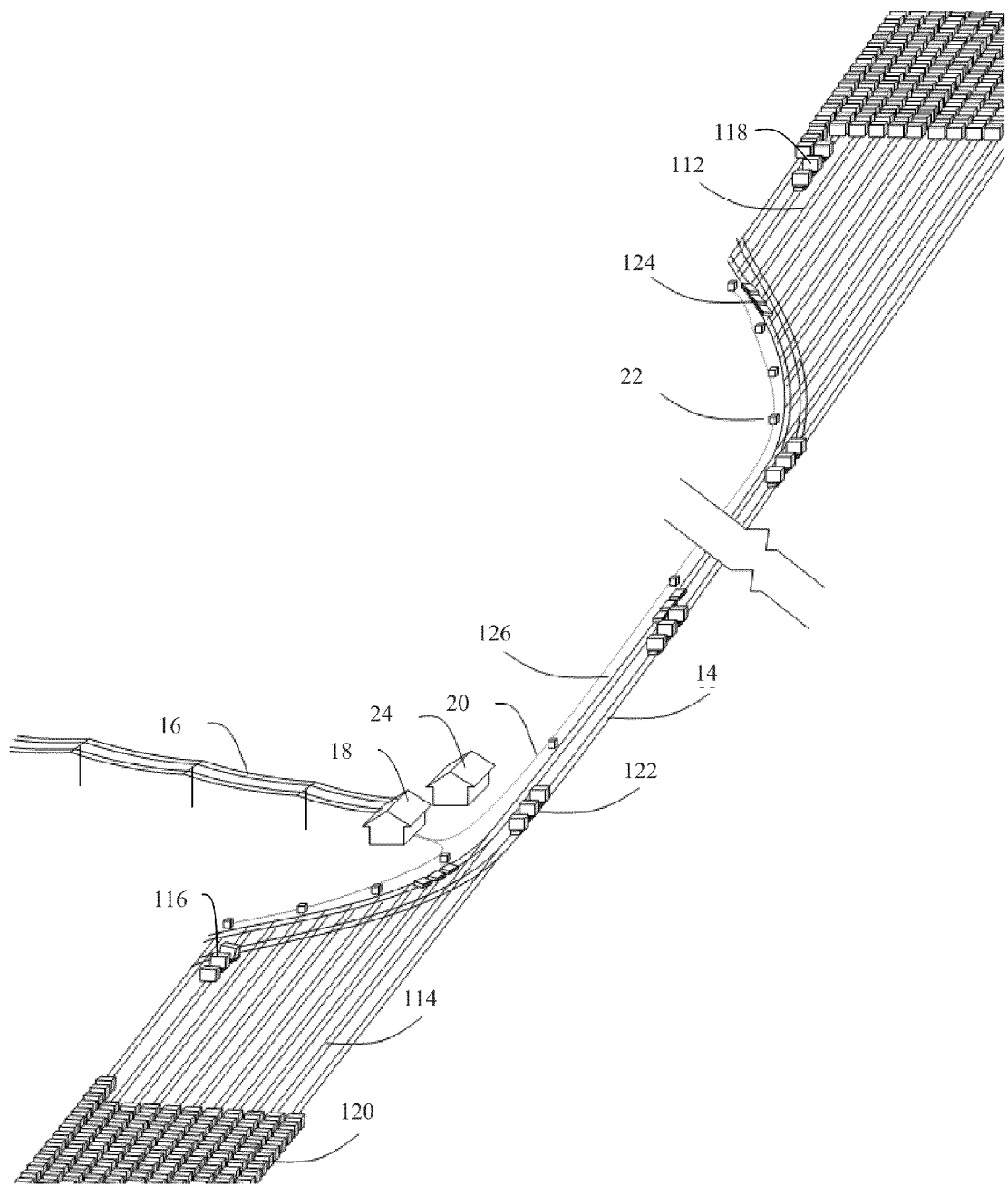
FIG. 8B of a third embodiment employing a two rail passing track system.

The passing track may also be employed in a third embodiment as shown in FIG. 8B in which shuttle units or consists operate by loading and unloading masses at an upper and lower storage yard 112 and 114 respectively with the empty consist bypassing the loaded consists on a parallel track while transitioning at higher speed to reload. For this embodiment, one set of shuttle units 116 to form consists is located at the lower storage yard which incorporates masses 120 stored suspended over the track and one set of shuttle units 118 at the upper storage yard also incorporating masses stored suspended over the track. During a regulation down command, a selected number of shuttle units forms a consist in the lower storage yard, toads a first set of masses and proceeds up the track, shown as consists 122, consuming power from the grid. Control of the consist is accomplished as described previously to obtain the desired power consumption to achieve the ordered regulation down. Empty shuttle units 124 from the upper storage yard are dispatched down the track bypassing the upward bound loaded consist on the passing track 126 to arrive at the lower storage yard for placement under the next set of masses stored over the track. Those masses are then loaded and as a full consist reaches the upper storage yard a newly loaded consist departs the lower storage yard for continuing regulation down. The consist in the upper storage yard unloads the masses and returns empty via the passing track to the lower storage yard and is then available for reloading.

Similarly, for a regulation up command, the set of shuttle units located at the upper storage yard is combined into one or more consists and loaded with masses from the upper storage yard. The loaded consist descends the track under control to provide power to the grid as previously described. Empty shuttle units from the lower storage yard ascend the track bypassing the descending consist on the passing track to be positioned under the next set of masses in the upper storage yard. Selection of consist size based on but exceeding the regulation up requirement allows excess power to be generated which then powers the ascending unloaded shuttle units. The empty units are then loaded with masses and upon the initial consist reaching the lower storage yard, the newly loaded consists are released to descend the track continuing the regulation up power output. The masses on the consist in the lower yard are unloaded and those shuttle units are then empty for transition back up the track and passing track for reloading.

Positioning and loading of the masses in a roll under format may be accomplished as described in application Ser. No. 12/852,504 entitled Utility Scale Electric Energy Storage System previously referenced. A single track or multiple switched spurs as shown in FIG. 8B may be employed in the upper and lower storage yards in various embodiments.

As described with respect to FIG. 5B, the upper and lower storage yards may be on level grade where it is desirable to employ the entire available vertical elevation for operation of the shuttle units in interaction with the grid.

For consists which may be located between the upper and lower storage yards as a result of the system receiving a stop command during regulation, such stranded consists may be employed as the first response to either a regulation up or regulation down command prior to loading masses from the upper or lower storage areas.

Figure 10A:
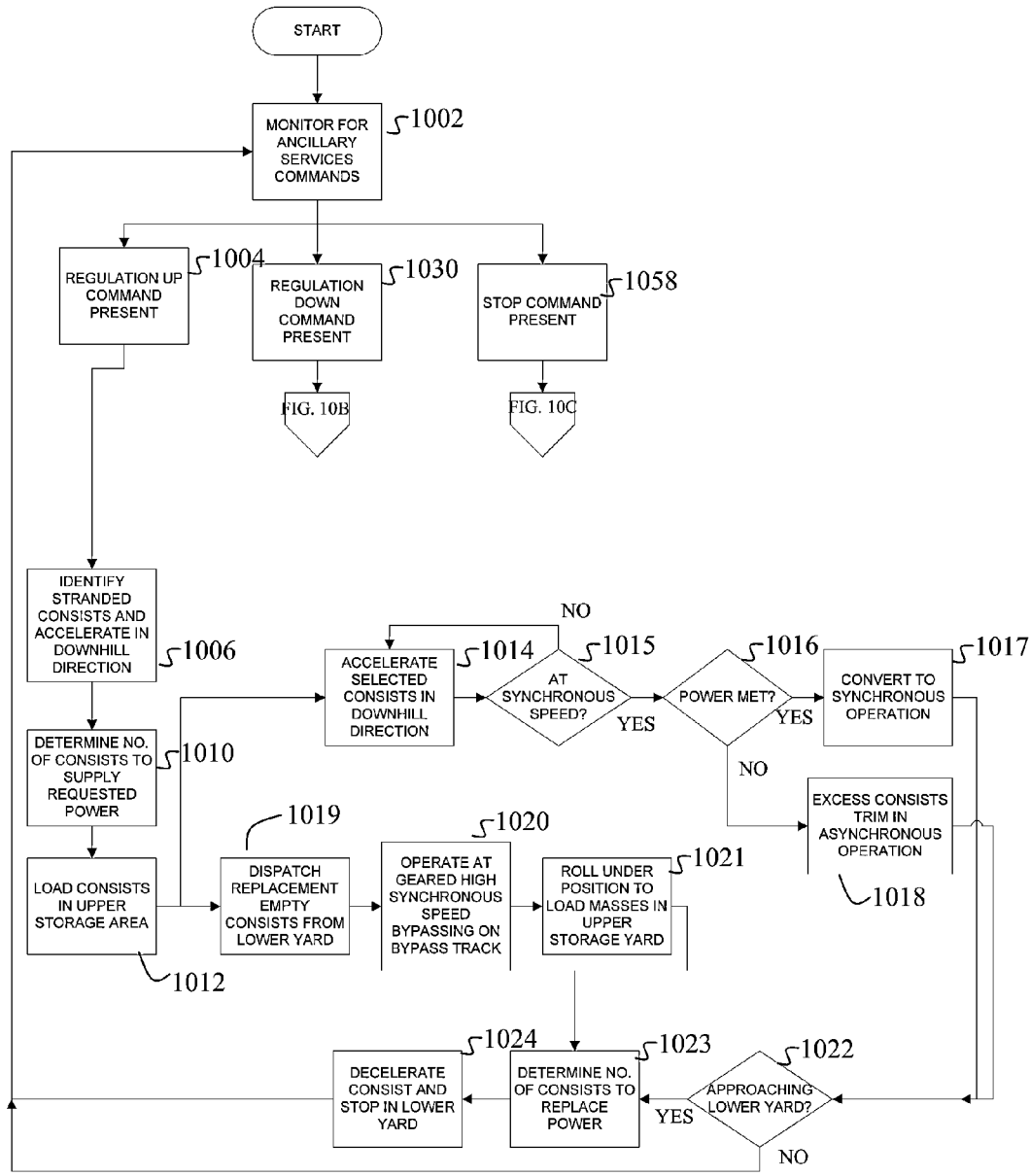
FIGS. 10A-10C are flow charts of operation for the third embodiment.
Figure 10B:
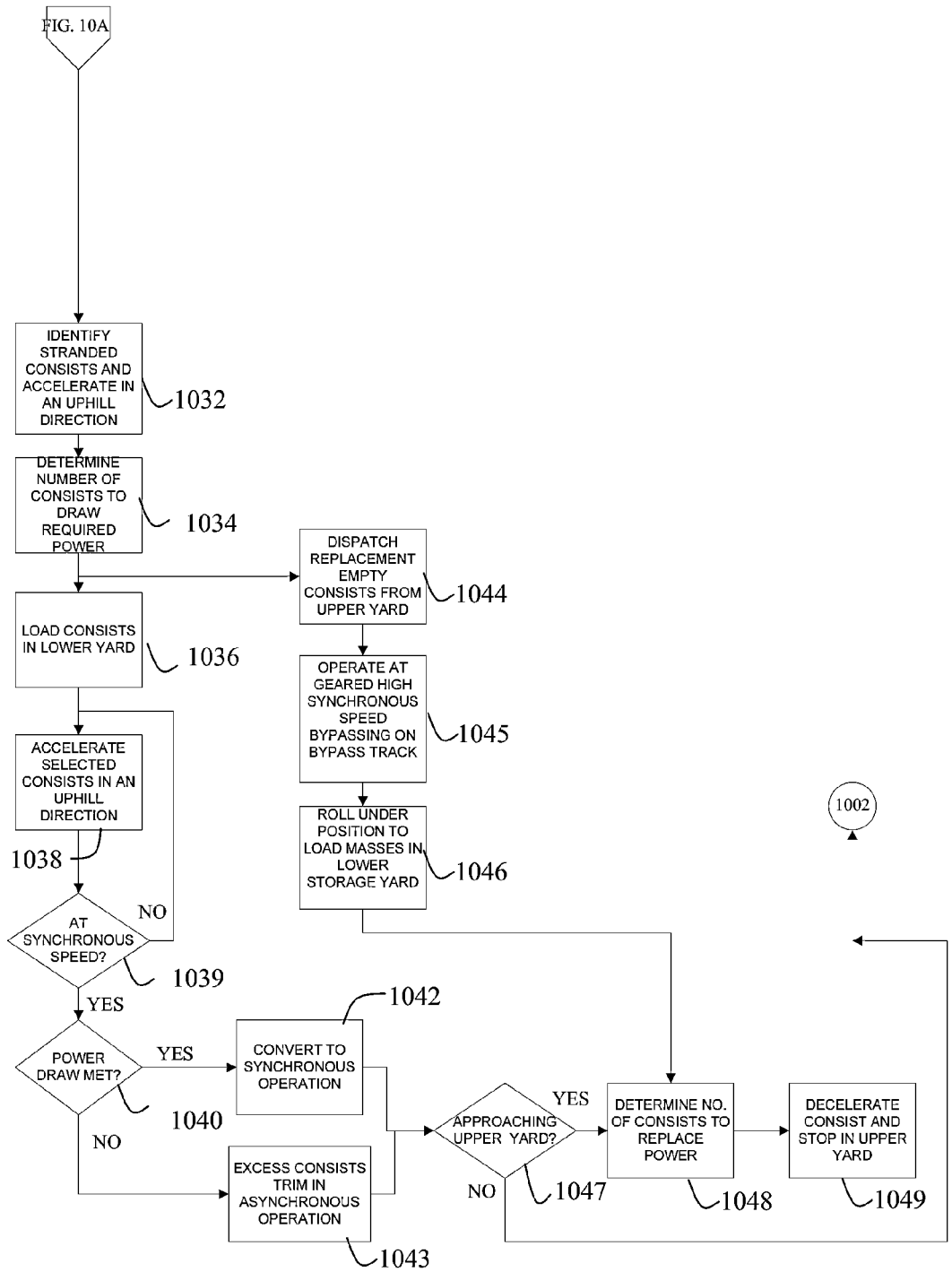
Figure 10C:
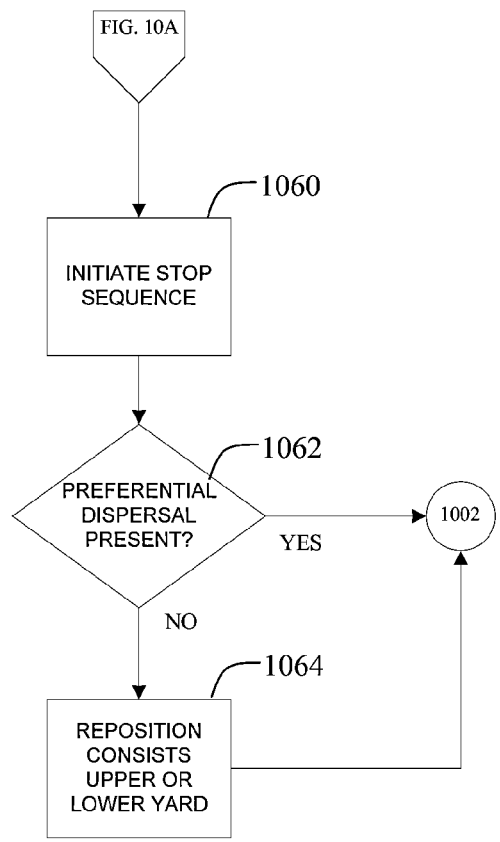

FIGS. 10A-10C demonstrate the operational method for the third embodiment of FIG. 8B. The SCADA monitors for regulation commands from the utility or ISO, step 1002. If a regulation up command is received, step 1004, a determination is made if any stranded loaded consists are present on the system, step 1006, and, if so, one or more of those stranded consists is directed to accelerate downgrade to provide power to the grid. If additional power is required or if no stranded consists are present, the number of consists for the power required to meet the regulation up command and provide power for unloaded shuttle units or consists to transition up the passing track from the lower storage area to upper storage area is determined, step 1010, and that number of consists is loaded with weights in the upper storage yard, step 1012. The loaded consists are then directed to accelerate down grade in generator mode providing power to the grid and system, step 1014. When synchronous speed is reached by the consists, step 1015, and power has not been met, step 1016, they are converted to synchronous operation, step 1017. Power is trimmed with asynchronous consists, step 1018. The dispatched replacement unloaded consists, step 1019 are translated up grade at approximately twice the downhill synchronous speed, step 1020, and roll-under positioned under the next stored weights in the upper storage yard, step 1021. As down grade consists reach the lower storage yard, step 1022, the SCADA determines the number of required replacement consists to maintain the required regulation up power production, step 1023, and decelerates the approaching consists to a stop converting any additional power to uphill power for the empty units transitioning up grade or accelerating replacement consists from the upper storage yard into down grade motion, step 1024.

Returning to step 1002, if a regulation down command is received, step 1030, a determination is made if any stranded loaded consists are present on the system, step 1032 (FIG. 10B), and, if so, one or more of those stranded consists is directed to accelerate up grade to draw power from the grid. If additional power draw is required or if no stranded consists are present, the number of consists for the power required to meet the regulation down command and including offsetting power generated from unloaded shuttle units or consists transitioning down the passing track from the upper storage area to lower storage area is determined, step 1034, and that number of consists is loaded with weights in the lower storage yard, step 1036. The loaded consists are then directed to accelerate up grade in motor mode extracting power to the grid and system, step 1038, and converting that power to potential energy with the masses raised on the grade. When synchronous speed is reached by the consists, step 1039, if total power has not been met, step 1040, they are converted to synchronous operation, step 1042. Any remaining asynchronous consists are operated to trim power, step 1043. The dispatched unloaded consists, step 1044, are translated down grade at approximately twice the up grade synchronous speed, step 1045, and roll-under positioned under the next stored weights in the lower storage yard, step 1046. As up grade consists reach the upper storage yard, step 1047, the SCADA determines the number of required replacement consists to maintain the required regulation down power conversion, step 1048, and decelerates the approaching consists to a stop converting any additional power to uphill power for the consist transitioning up grade, step 1049.

Returning to step 1002, if at any time during operation a stop command (no regulation up or regulation down) is received, step 1058, the SCADA initiates a stop sequence, step 1060 (FIG. 10C). If regulation conditions allow, the stop may be generated by deceleration created by a reversal of motor/generator mode in the consists. If the regulation condition requires no input to or extraction of power from the grid, power may be removed from the motor/generator systems of the consists and mechanical braking employed to stop.

With the consists in the stopped condition, the SCADA determines if a predetermined preferential dispersal of consists is present, step 1062. If not, empty consists are repositioned to the upper or lower storage area, step 1064, for optimum response to either regulation up or regulation down commands. If transitioning from the upper storage area to lower storage area, gravity acceleration of the consists with deceleration by mechanical braking may be employed without any grid impact. If transitioning from the lower storage area to the upper storage area, independent on site power generation may be employed to provide power in motor mode to position the consists, again without impact to the grid.

Figure 9A:
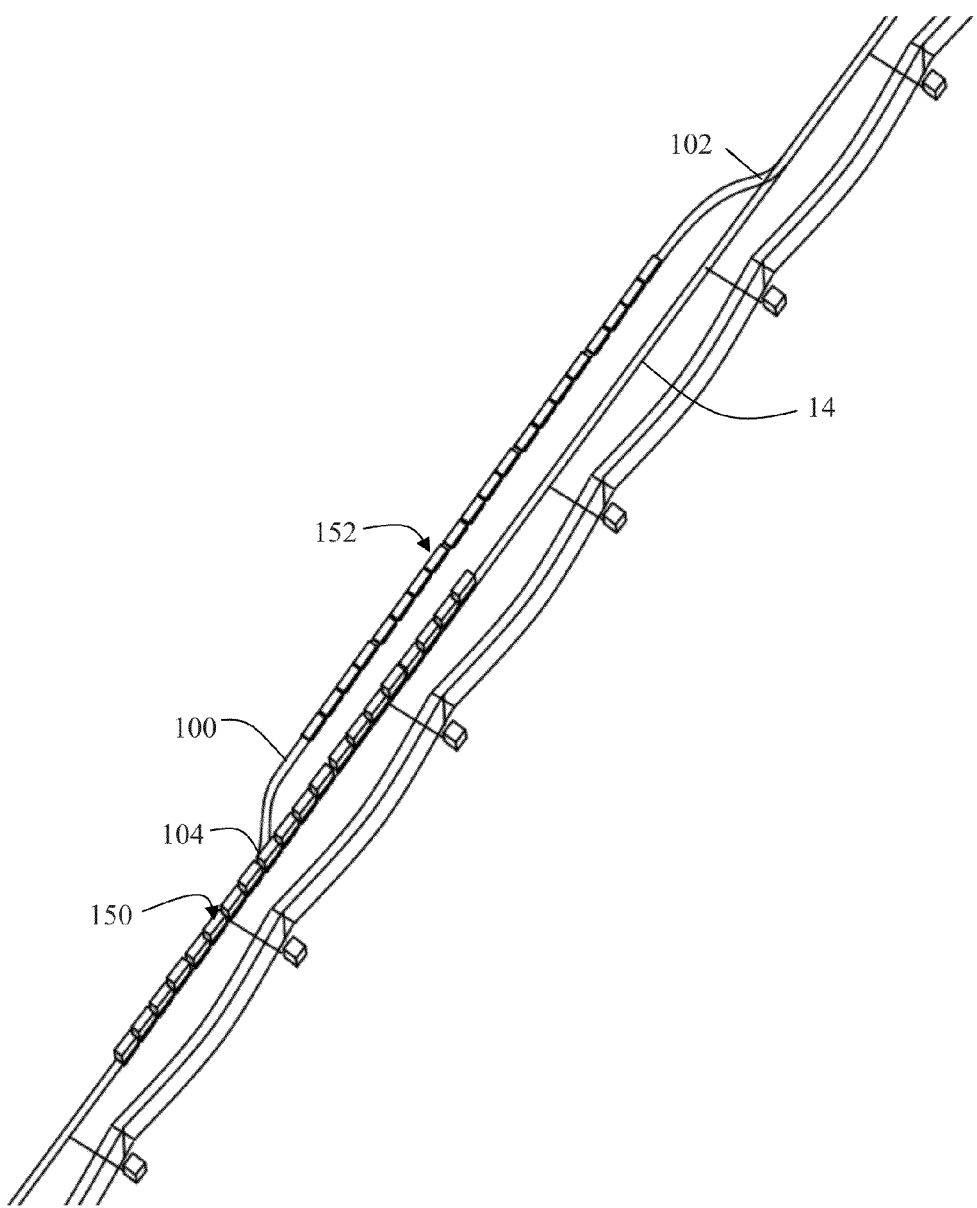
FIG. 9A is a pictorial view of a fourth embodiment employing two trains for alternating loaded regulation operation and empty return employing a bypass track and mass reloading/unloading for extended operation.
Figure 9B:
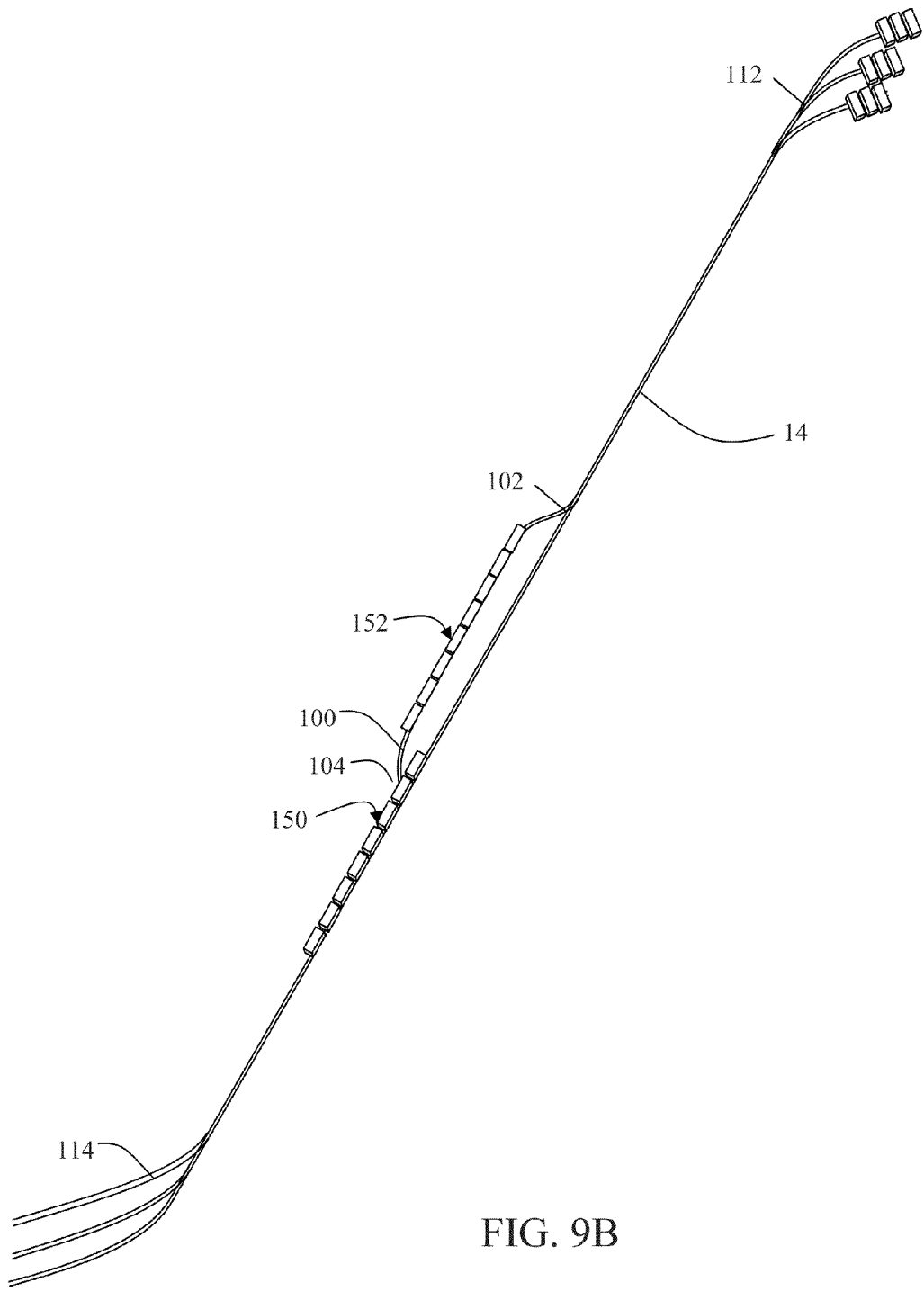
FIG. 9B is a pictorial view of the fourth embodiment with upper and lower storage yards.

The fourth embodiment shown in FIGS. 9A and 9B operates with two trains having multiple shuttle units to support masses with a main track 14 extending between an upper storage area 112 and a comparable lower storage area 114 and a bypass track 100 having an upper switch 102 and a lower switch 104. A first train 150 is loaded with masses and provides operation on the main track for regulation up and regulation down commands issued by the ISO or utility operating the grid. The second train 152 is initially empty and positioned on the bypass track.

Figure 11A:
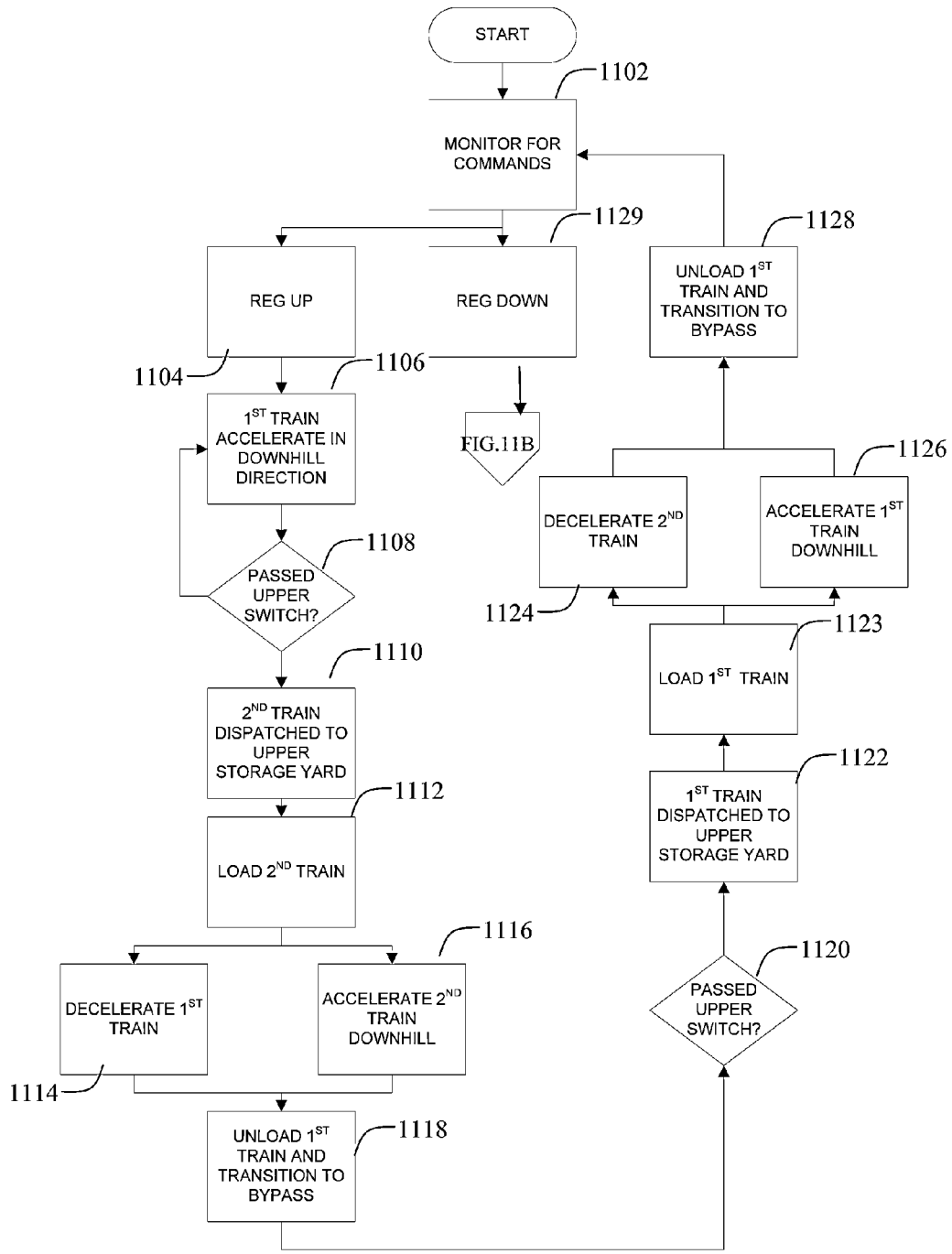
FIGS. 11A-11B are flow charts of operation for the fourth embodiment.
Figure 11B:
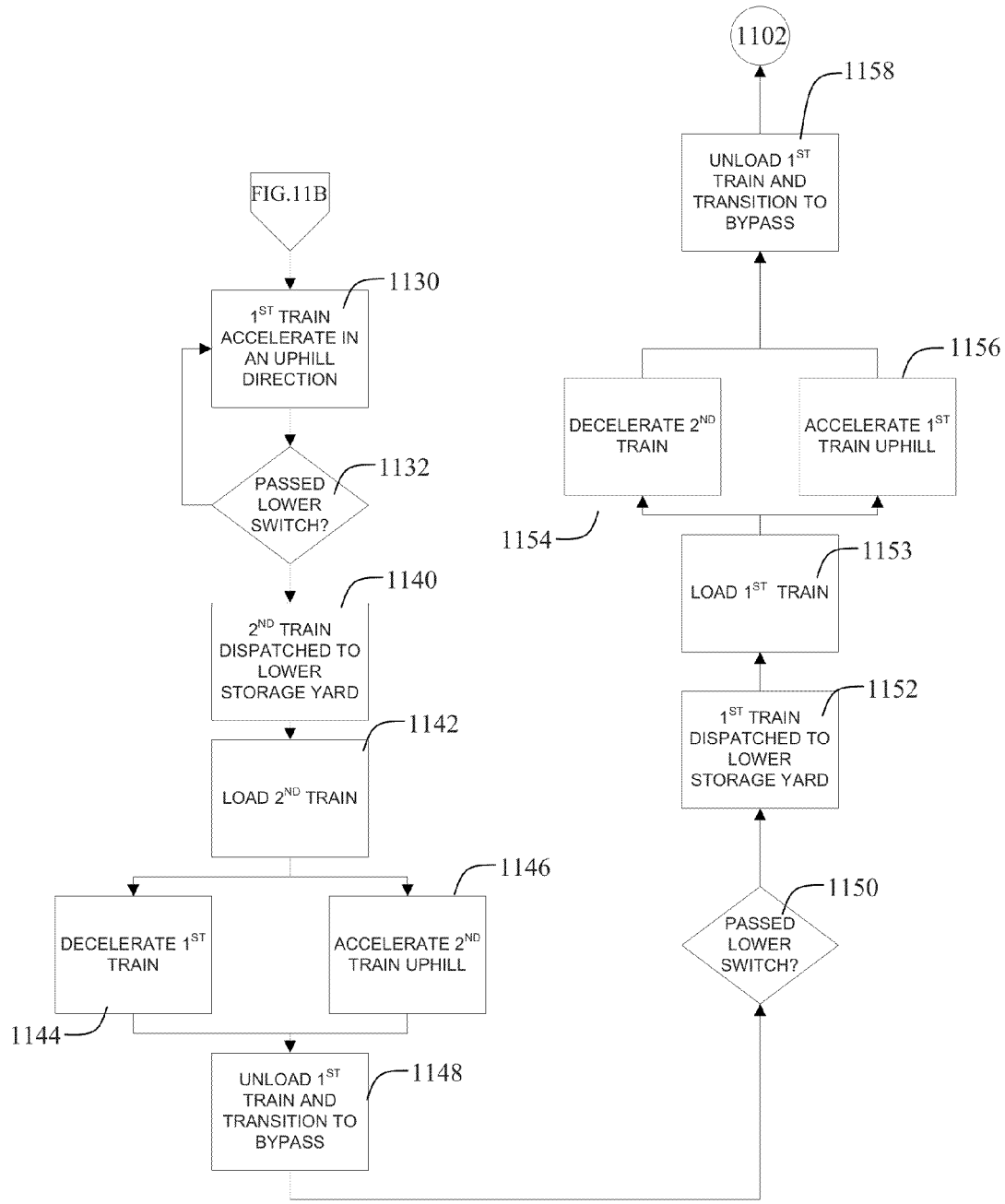

As shown in FIGS. 11A and 11B the SCADA system monitors for commands, step 1102, and for regulation up commands, step 1104, the first train proceeds downward along the main track in generator mode providing power to the grid, step 1106 and upon passing the upper switch for the bypass track, step 1108, the second train is dispatched at a speed to reach the upper storage yard before the first train reaches the lower storage yard, step 1110. The speed of the first train is adjusted to provide power to the empty second train while meeting load requirements of the regulation up command. The second train is loaded with masses in the upper yard and positioned for down hill travel, step 1112. When the first train reaches the lower storage yard and decelerates, step 1114, the second train is dispatched from the upper storage yard accelerating to replace the power change in the first train, step 1116. The first train is then unloaded in the lower storage yard and transitions to the bypass track prior to the second train reaching the lower switch, step 1118. When the second train has passed the upper switch, step 1120, the first train is dispatched to the upper storage yard, step 1122, and reloaded with masses, step 1123. As the second train reaches the lower storage yard and decelerates, step 1124, the first train is dispatched from the upper storage yard accelerating to replace the power change in the second train, step 1126. The second train is then unloaded in the lower storage area and transitions to the bypass track prior to the first train reaching the lower switch, step 1128, to continue the process with the first and second trains now reversed.

In response to a regulation down command (FIG. 11B), step 1129, the first train proceeds upward along the main track 1130 and upon passing the lower switch for the bypass track, step 1132, the second train is dispatched at a speed to reach the lower storage yard before the first train reaches the upper storage yard, step 1140. Speed of the first train is adjusted to absorb power from the empty second train travelling down hill to maintain load requirements for the regulation down. The second train is loaded with masses in the lower storage yard and positioned for uphill travel, step 1142. When the first train reaches the upper storage yard and decelerates, step 1144, the second train is dispatched from the lower storage yard accelerating to replace the power change in the first train, step 1146. The first train is then unloaded in the upper storage area and transitions to the bypass track prior to the second train reaching the upper switch, step 1148. When the second train has passed the tower switch, step 1150, the first train is dispatched to the lower storage yard, step 1152, and reloaded with masses, step 1153. As the second train reaches the upper storage yard and decelerates, step 1154, the first train is dispatched from the lower storage yard accelerating uphill to replace the power change in the second train, step 1156. The second train is then unloaded in the upper storage area and transitions to the bypass track prior to the first train reaching the upper switch, step 1158, to continue the process.

Trimming of regulated power is accomplished by varying the speed of the loaded train up or down the track as required. White described with respect to FIGS. 11A and 11B as initiated with the trains at the midpoint, interlocking of the timed transitions between the loaded moving train and the train in the storage yard for loading and unloading and transitioning empty through the bypass track allows reversal of the process at any point in the sequence in response to regulation commands.

The use of rectifier/inverters which are partially rated based on the motor/generator requirements allows use of the combined IGBT reactive power control of all powered shuttle units in the system to Voltage-Ampere Reactive (VAR) power support to the utilities or ISOs connected to the system. At least one IGBT in each shuttle unit is connected to the high voltage transmission system through the onboard and trackside electrical systems as shown and described with respect to FIG. 2B. Real power commands (P component) from the TCU control board provide for necessary acceleration and deceleration operations of the shuttle units. The reactive power (Q component) available in the rectifier/inverter IGBTs can be controlled for reactive power input/absorption from the high voltage system as described above. For all shuttle units not producing any real power (stopped awaiting loading or transit) the entire power capability of the IGBTs in the TCU is available for reactive power. Upon command, reactive current (out of phase with the voltage input) directed through the rectifier/inverter IGBTs by the control board may be employed to create a large influence on the voltage in the electrical grid system. Voltage measurement and VAR command inputs may be derived from electrical grid control center voltage measurement at desired locations geographically separated from the ARES system. System input and control for accomplishing VAR may be implemented as described in application Ser. No. 12/852,504 entitled Utility Scale Electric Energy Storage System previously referenced.

While the foregoing written description of the invention enables one of ordinary skill to make and use an example embodiment, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A utility grid ancillary services system comprising:
   an inclined track;
   a utility grid connection system associated with the track;
   at least one shuttle unit riding on the inclined track and having at least one motor/generator and an electrical system controlling the at least one motor/generator, said motor/generator connected to draw power from or provide power to the utility grid connection system;
   a controller in communication with an electric utility and having a processor and a memory containing modules of software instructions for control of the onboard electrical system including
      modules for increasing force generated by the motor/generator in an uphill direction to change the speed of said shuttle unit on the inclined track responsive to a regulation down command from the utility thereby absorbing additional power from the utility grid or decreasing the amount of power provided to the grid and
      modules for decreasing force generated by the motor/generator in an uphill direction to change the speed of said shuttle unit on the inclined track responsive to a regulation up command from the utility thereby generating additional power to supply the utility grid or decreasing the amount of power absorbed from the grid.

2. The utility grid ancillary services system as defined in claim 1 wherein the at least one shuttle unit comprises a plurality of shuttle units interconnected as a single train.

3. The utility grid ancillary services system as defined in claim 1 wherein the at least one shuttle unit comprises a plurality of shuttle units selectively connected as a second plurality of consists.

4. The utility grid ancillary services system as defined in claim 1 further comprising a bypass track connected to the inclined track.

5. The utility grid ancillary services system as defined in claim 1 further comprising an upper parking area connected to a top of the inclined track.

6. The utility grid ancillary services system as defined in claim 1 further comprising a lower parking area connected to a bottom of the inclined track.

7. The utility grid ancillary services system as defined in claim 1 wherein the shuttle units include mechanical brakes and the software modules include a module for application of the mechanical brakes for changing speed of the shuttle unit without input to the utility grid.

8. The utility grid ancillary services system as defined in claim 1 wherein the at least one shuttle unit comprises a plurality of shuttle units and the inclined track has a central queue for initial optimal positioning of the shuttle units.

9. The utility grid ancillary services system as defined in claim 8 wherein the software modules further include a module for prioritizing shuttle unit selection for response to a regulation up or regulation down command.

10. The utility grid ancillary services system as defined in claim 8 wherein the software modules further include a module for decelerating a first shuttle unit approaching a stopped shuttle unit and transferring power from the first shuttle unit to a second shuttle unit by acceleration having complementary power consumption or production to the first shuttle unit.

11. The utility grid ancillary services system as defined in claim 1 further comprising an upper storage area and a lower storage area, said at least one shuttle unit comprises a plurality of shuttle units and said module for increasing force generated by the motor/generator in an uphill direction includes a module for loading a selected number of the plurality of shuttle units with masses in the lower storage area consistent with power absorption required by the regulation down command.

12. The utility grid ancillary services system as defined in claim 1 further comprising an upper storage area and a lower storage area, said at least one shuttle unit comprises a plurality of shuttle units and said module for decreasing force generated by the motor/generator in an uphill direction includes a module for loading a selected number of the plurality of shuttle units with masses in the upper storage area consistent with power generation required by the regulation up command.

13. A method for providing ancillary services to utility grid employing an electrically powered train carrying masses comprising:
   monitoring for commands from a utility or independent system operator (ISO);
   upon receiving a regulation down command determine if a train having at least one ma or/generator is at an upper terminus of an inclined track;
   responsive to a negative determination operating the train with the motor/generator increasing the uphill force on the train until the power requirement of the regulation down command is met.

14. The method of claim 13 wherein the step of operating the train comprises operating in motor triode increasing absorbed power from the grid to drive the train up the grade.

15. The method of claim 13 wherein the step of operating the train comprises operating in generator mode but reducing the amount of power provided to the grid with speed of the train determined based on the power requirement of the regulation down command.

16. The method of claim 13 further comprising:
   upon receiving a regulation up command determining if the train is at a tower terminus of the track;
   responsive to a negative determination operating the train with the motor/generator decreasing the uphill force on the train until the power requirement of the regulation up command is met.

17. The method of claim 16 wherein the step of operating the train comprises operating in generator mode increasing amount of power provided to the grid.

18. The method of claim 16 wherein the step of operating the train comprises operating in motor mode but reducing the absorbed power from the grid to drive the train up the grade with speed of the train determined based on the power requirement of the regulation down command.

19. A method for providing ancillary services to utility grid comprising:
   monitoring for commands from a utility or independent system operator (ISO);
   upon receipt of a regulation down command, determining a number of consists required to store power required consistent with the regulation down command;
   determining the location of all consists in a system;
   establishing a priority for regulation down usage with highest priority to consists present below a central queue, next priority for consists at a top of the central queue and lowest priority to consists above the central queue;
   based on the established priority, accelerating one or more consists up the grade with the motor/generator in motor mode storing power from the grid by raising the consist up the grade or decelerating one or more consists traveling down the grade with the motor/generator in generator mode reducing power supplied to the grid.

20. The method of claim 19 further comprising:
upon reaching a predetermined synchronous operating speed, if power has been met, switching each operating consist to synchronous operation for maximum efficiency.

21. The method of claim 20 further comprising maintaining any moving consist not at synchronous speed in asynchronous operation with regulation of speed to trim the required power when desired power is reached.

22. The method of claim 19 further comprising:
upon receipt of a regulation up command determining a number of consists required to supply power required consistent with the regulation up command;
determining the location of all consists in the system;
establishing a priority for regulation up usage with highest priority to consists present above the central queue, next priority for at the bottom of the central queue and lowest priority to consists below the central queue;
selected based on the established priority, accelerating one or more consists down grade with the motor/generator in generator mode providing power to the grid by converting the potential energy of the consists or decelerating one or more consists traveling up grade with the motor or motor/generator in motor mode decreasing the amount of power absorbed from the grid by converting the potential energy of the consists;
upon reaching a predetermined synchronous operating speed, if the power has not yet been met, switching each operating consist to synchronous operation for maximum efficiency; and,
maintaining any moving consist not at synchronous speed in asynchronous operation with regulation of speed to trim the required power.

23. The method of claim 20 further comprising:
accelerating a consist to absorb power from a consist decelerating to reduce power to the grid.

* * * * *